(12) United States Patent
Chen et al.

(10) Patent No.: US 10,572,991 B2
(45) Date of Patent: Feb. 25, 2020

(54) SYSTEM AND METHOD FOR ALIGNING SEMICONDUCTOR DEVICE REFERENCE IMAGES AND TEST IMAGES

(71) Applicant: KLA-Tencor Corporation, Milpitas, CA (US)

(72) Inventors: Hong Chen, San Ramon, CA (US); Michael Cook, Workingham (GB); Pavan Kumar, San Jose, CA (US); Kenong Wu, Davis, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 68 days.

(21) Appl. No.: 15/837,582

(22) Filed: Dec. 11, 2017

(65) Prior Publication Data

US 2019/0139208 A1    May 9, 2019

Related U.S. Application Data

(60) Provisional application No. 62/582,507, filed on Nov. 7, 2017.

(51) Int. Cl.
*G06T 7/00* (2017.01)
*G06T 7/73* (2017.01)
(Continued)

(52) U.S. Cl.
CPC ............ *G06T 7/001* (2013.01); *G06K 9/6203* (2013.01); *G06T 7/33* (2017.01); *G06T 7/74* (2017.01); *G06T 2207/30148* (2013.01)

(58) Field of Classification Search
CPC .. G06T 7/001; G06T 7/74; G06T 7/33; G06T 2207/30148; G06K 9/6203
See application file for complete search history.

(56) References Cited

U.S. PATENT DOCUMENTS 6,539,106 B1 * 3/2003 Gallarda ............. G01R 31/307
382/149
7,796,804 B2    9/2010 Bhaskar et al.
(Continued)

FOREIGN PATENT DOCUMENTS

KR    20160021807 A    2/2016
WO    2016149690 A1    9/2016

OTHER PUBLICATIONS

International Search Report dated Feb. 22, 2019 for PCT/US2018/059128.
(Continued)

*Primary Examiner* — Leon Flores
(74) *Attorney, Agent, or Firm* — Suiter Swantz pc llo

(57) ABSTRACT

A method may include, but is not limited to, receiving a plurality of reference images of a wafer. The method may include, but is not limited to, receiving the plurality of test images of the wafer. The method may include, but is not limited to, aligning the plurality of reference images and the plurality of test images via a coarse alignment process. The method may include, but is not limited to, aligning the plurality of reference images and the plurality of test images via a fine alignment process after alignment via the coarse alignment process. The fine alignment process may include measuring individual offsets and correcting individual offset data between at least one of the plurality of reference images and the plurality of test images.

49 Claims, 14 Drawing Sheets

(51) Int. Cl.
  *G06K 9/62*   (2006.01)
  *G06T 7/33*   (2017.01)

(56) References Cited

U.S. PATENT DOCUMENTS

| | | |
|---|---|---|
| 9,748,128 B1 | 8/2017 | Chao et al. |
| 2005/0068508 A1 | 3/2005 | Mattiza et al. |
| 2014/0212024 A1 | 7/2014 | Chen et al. |
| 2016/0061749 A1* | 3/2016 | Chen .................. G01N 21/9501 356/237.5 |
| 2017/0228866 A1 | 8/2017 | Jain et al. |

OTHER PUBLICATIONS

Chris Harris and M. Stephens, A Combined Corner and Edge Detector, Proceedings of the 4th Alvey Vision Conference, pp. 147-151, 1988, Plessey Research Roke Manor, United Kingdom, © The Plessey Company plc.

* cited by examiner

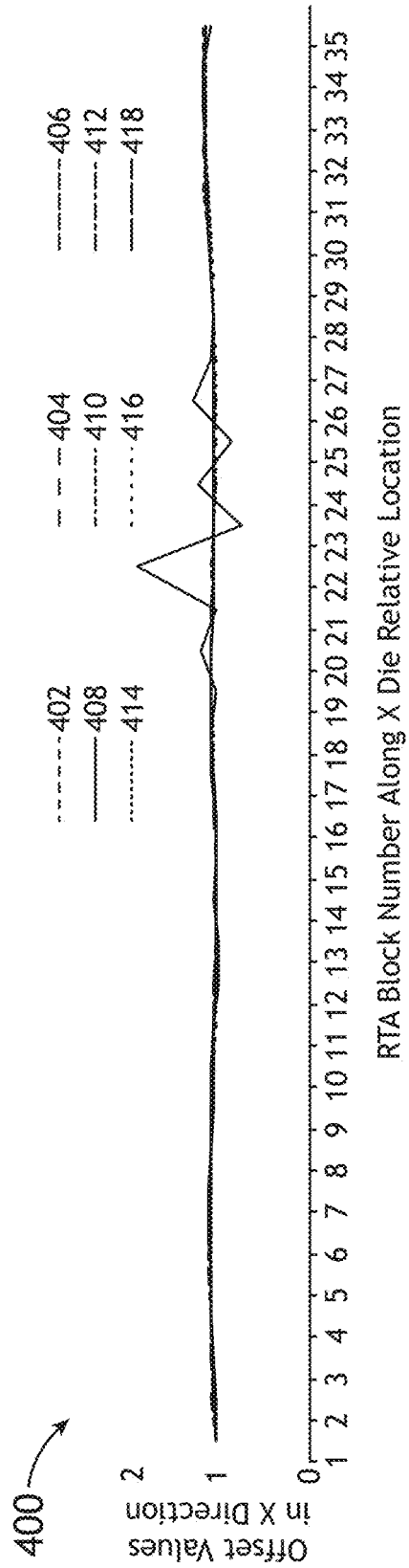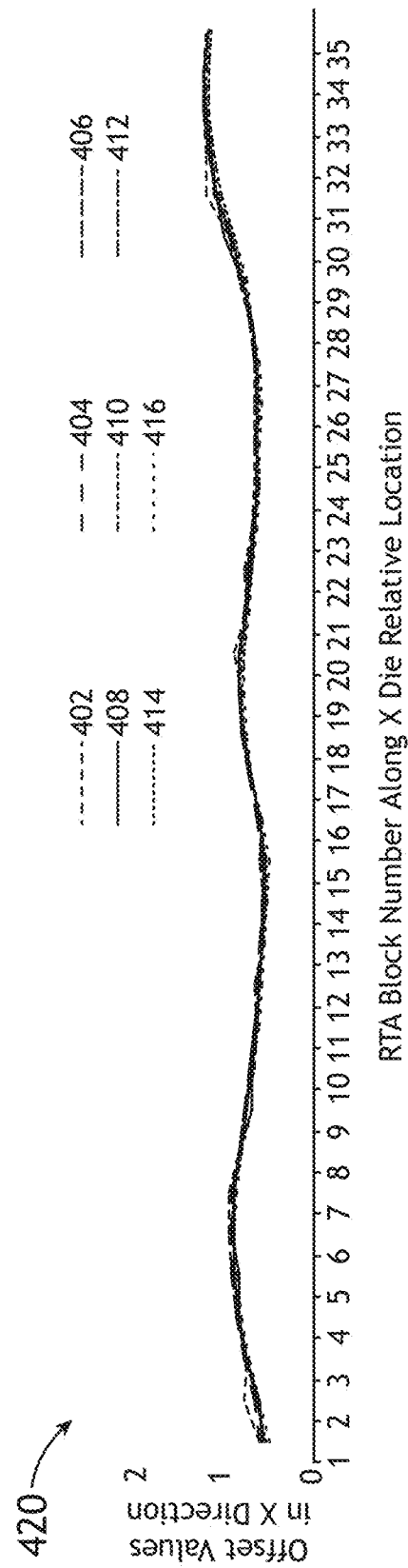

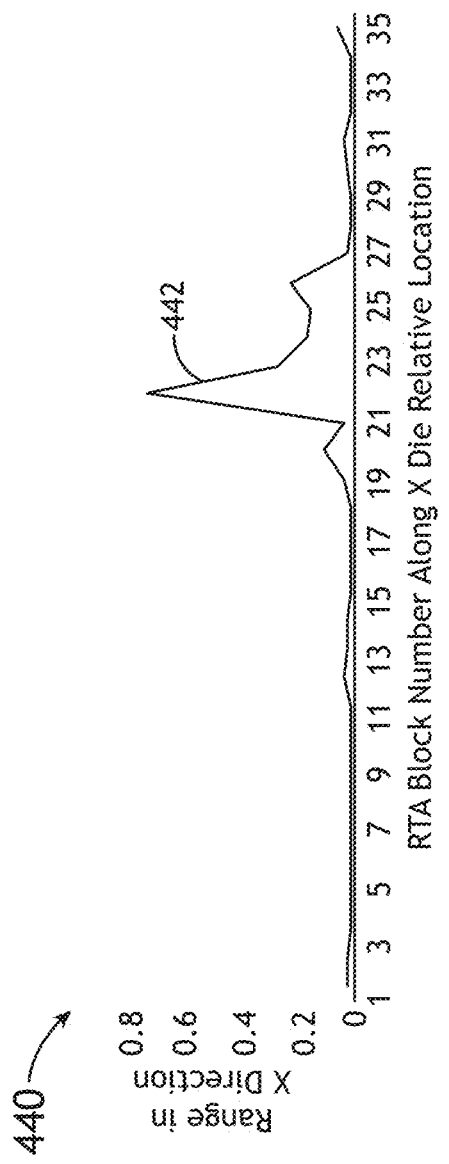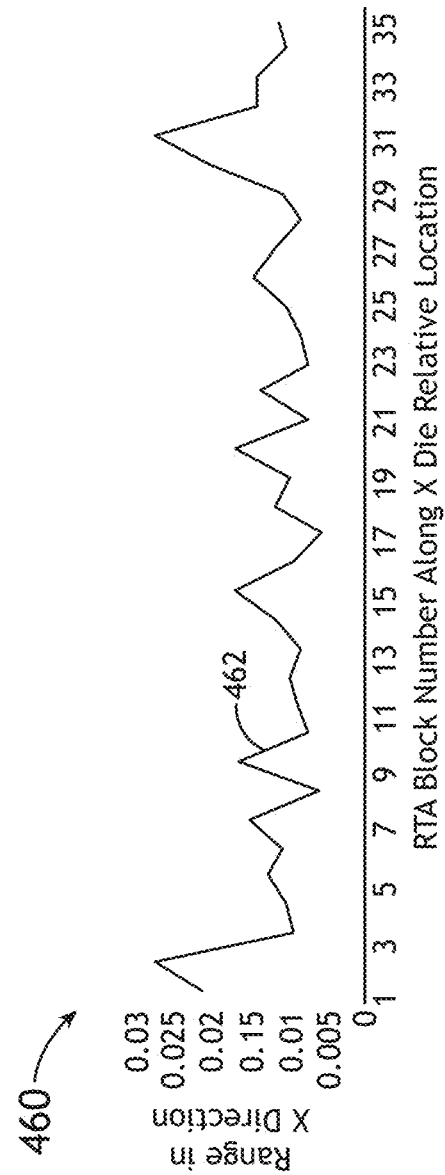

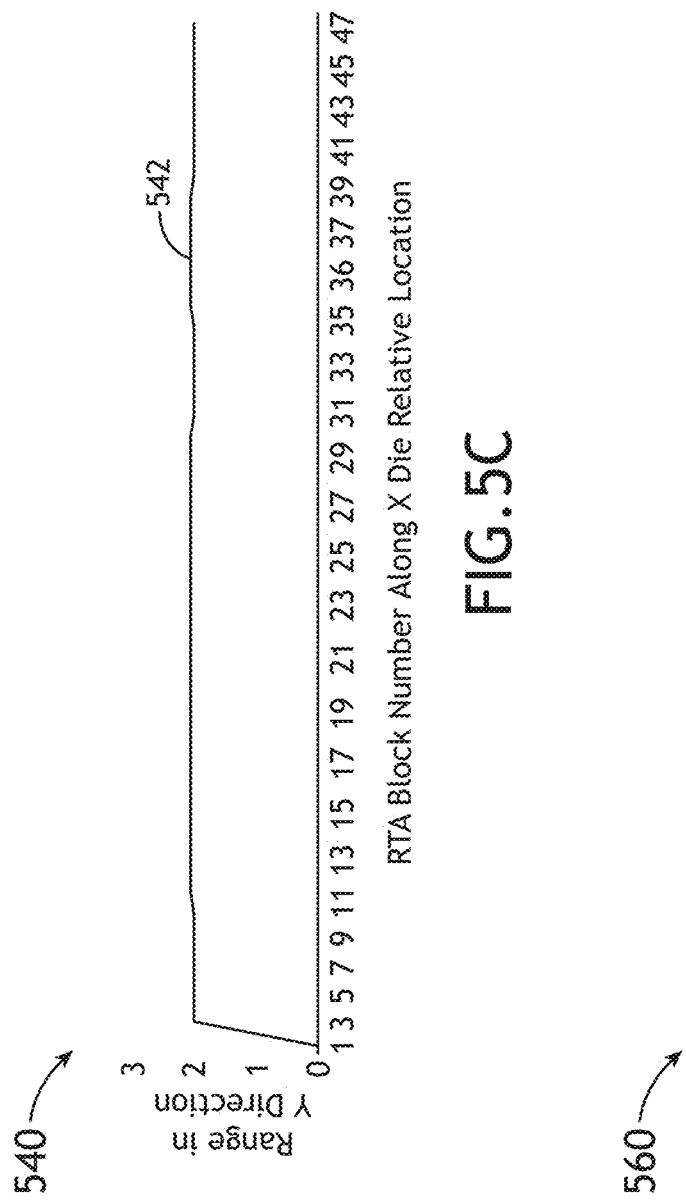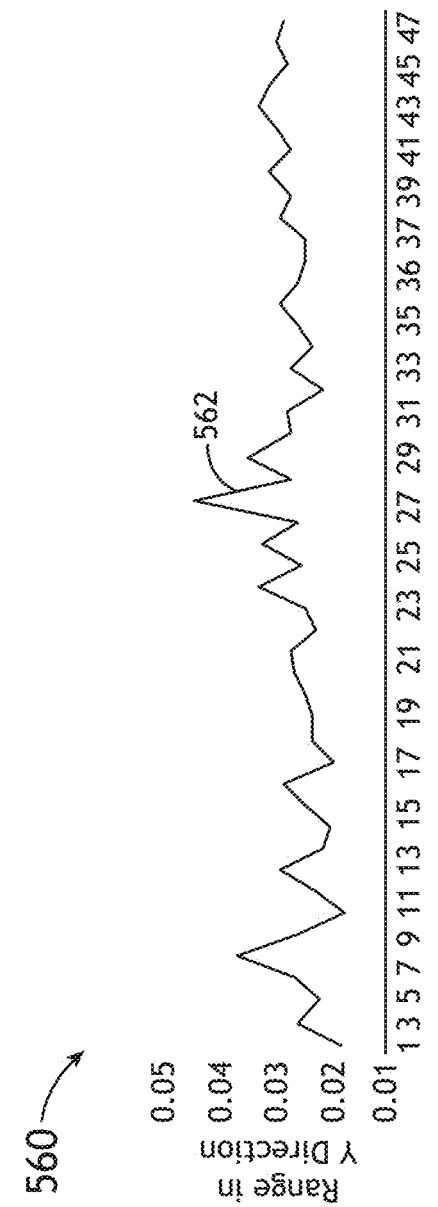
FIG. 5C
FIG. 5D

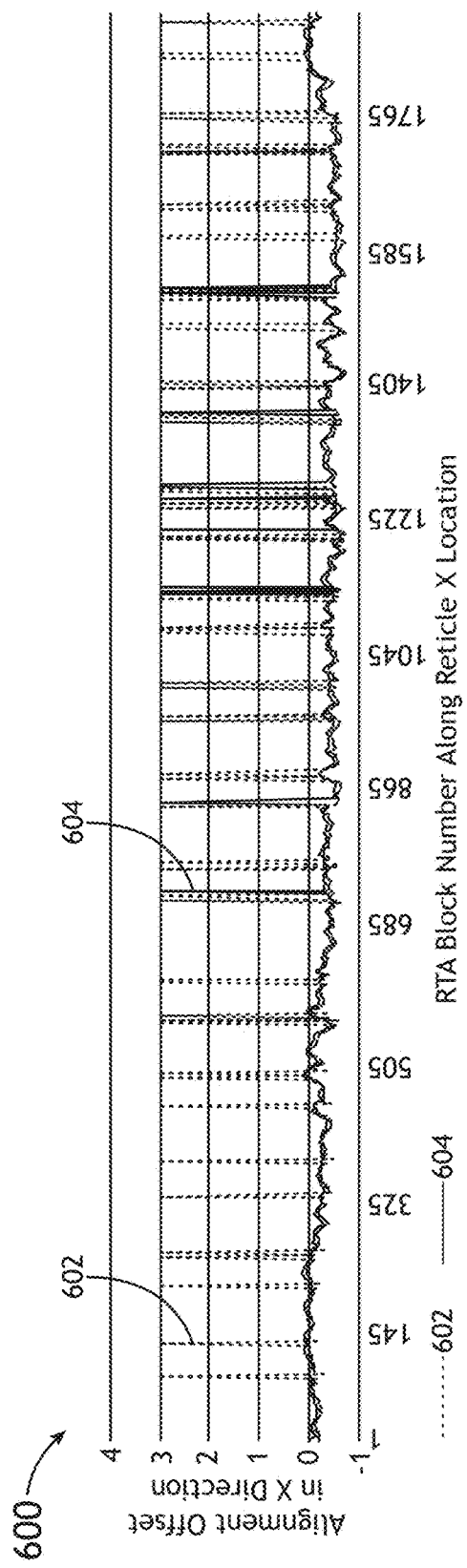
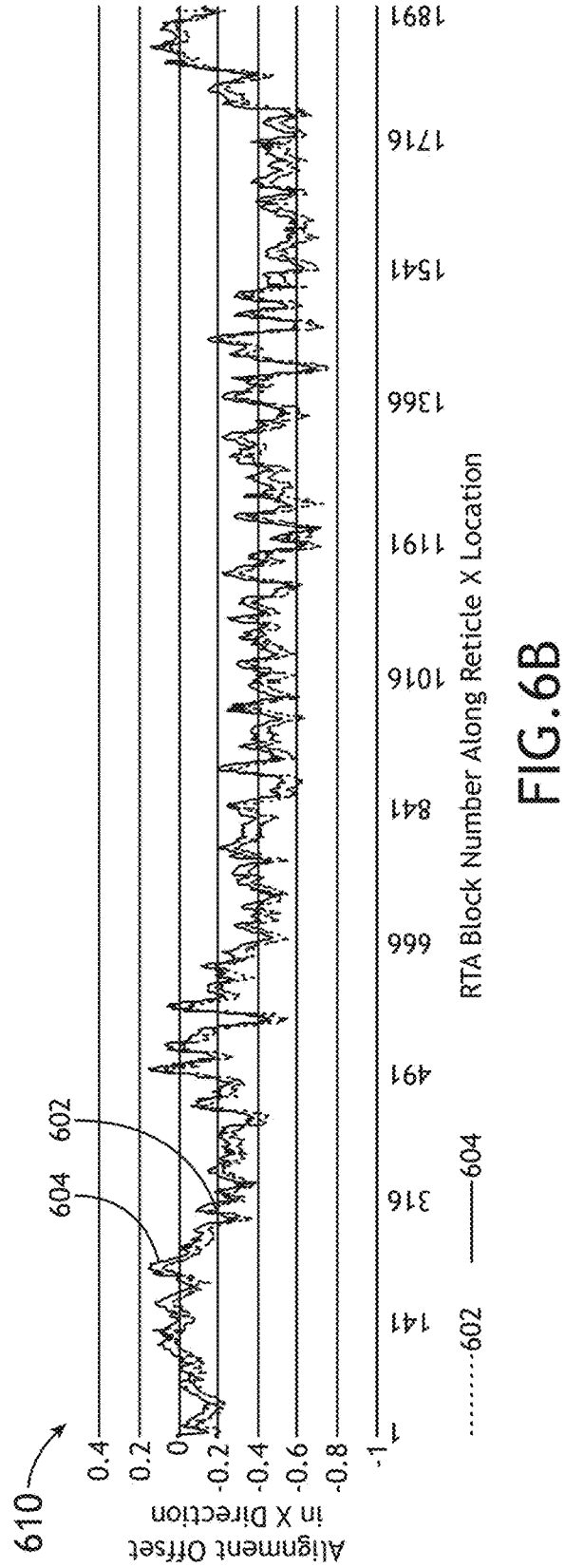
FIG.6A
FIG.6B

SYSTEM AND METHOD FOR ALIGNING SEMICONDUCTOR DEVICE REFERENCE IMAGES AND TEST IMAGES

CROSS-REFERENCE TO RELATED APPLICATIONS

The present application claims the benefit under 35 U.S.C. § 119(e) of U.S. Provisional Patent Application Ser. No. 62/582,507, filed Nov. 7, 2017, entitled SOFTWARE ALGO BASED ALIGNMENT TO ALIGN TEST AND REFERENCE TO 05 PIXEL 3 SIGMA EVERY WHERE ON THE WAFER, naming Hong Chen, Michael Cook, Pavan Kumar, and Kenong Wu as inventors, which is incorporated herein by reference in the entirety.

TECHNICAL FIELD

The present invention generally relates to semiconductor wafer fabrication and metrology and, more particularly, to a method and system for alignment of semiconductor device reference images and test images.

BACKGROUND

The fabrication of semiconductor devices, such as logic and memory devices, typically includes processing a semiconductor device using a large number of semiconductor fabrication and metrology processes to form various features and multiple layers of the semiconductor devices. Some fabrication processes utilize photomasks/reticles to print features on a semiconductor device such as a wafer. As semiconductor devices become smaller and smaller laterally and extended vertically, it becomes critical to develop enhanced inspection and review devices and procedures to increase sensitivity and throughput of wafer and photomask/reticle inspection processes.

Semiconductor devices may develop defects during the fabrication processes. Inspection processes are performed at various steps during a semiconductor manufacturing process to detect defects on a specimen. Inspection processes are an important part of fabricating semiconductor devices such as integrated circuits. These inspection processes become even more important to successfully manufacture acceptable semiconductor devices as the dimensions of semiconductor devices decrease. Detection of defects has become highly desirable as the dimensions of semiconductor devices decrease, as even relatively small defects may cause unwanted aberrations in the semiconductor devices. Detecting defects may require accurate alignment of reference images and test images of a semiconductor device via an image alignment process. The image alignment process may include measuring the offset between the reference images and the test images and shifting the reference images and/or the test images by the measured offsets.

Image alignment processes known in the art include coarse alignment processes, which achieve accuracy to within ±one pixel everywhere on the semiconductor device. Coarse alignment processes that align images for an entirety of a swath or select zones of a swath use fewer alignment targets that may be qualified for measuring alignment offsets. If the alignment target is not present and/or the offset measurement is incorrect, alignment accuracy can be poor, and any subsequent defect detection may include false defects caused by misalignment between the coarsely-aligned test and reference images.

Other image alignment processes known in the art include hardware runtime alignment (RTA) processes which can perform alignment across dies from the same scan. Hardware RTA processes may have issues with sparse patterns and large areas of repeating patterns. In addition, the alignment processes may only be able to align die to die within the same scan. Further, hardware RTA processes can only align images with small initial offset and are not flexible to handle large image offset, such as 20 pixels, due to hardware limitations.

Therefore, it would be desirable to provide a method and system for the alignment of semiconductor device reference images and test images, that cures the shortcomings as described above.

SUMMARY

A system is disclosed, in accordance with one or more embodiments of the present disclosure. In one embodiment, the system includes a controller. In another embodiment, the controller includes one or more processors configured to receive one or more images from a characterization tool. In another embodiment, the controller includes memory configured to store a set of program instructions. In another embodiment, the one or more processors are configured to execute the set of program instructions. In another embodiment, the set of program instructions are configured to cause the one or more processors to receive a plurality of reference images of a wafer. In another embodiment, the set of program instructions are configured to cause the one or more processors to receive a plurality of test images of the wafer. In another embodiment, the set of program instructions are configured to cause the one or more processors to align the plurality of reference images and the plurality of test images via a coarse alignment process. In another embodiment, the set of program instructions are configured to cause the one or more processors to align the plurality of reference images and the plurality of test images via a fine alignment process after alignment via the coarse alignment process. In another embodiment, the fine alignment process includes measuring individual offsets and correcting individual offset data between at least one of the plurality of reference images and the plurality of test images.

A system is disclosed, in accordance with one or more embodiments of the present disclosure. In one embodiment, the system includes a characterization tool configured to acquire a plurality of test images of a wafer. In another embodiment, the system includes a controller. In another embodiment, the controller includes one or more processors configured to receive one or more images from the characterization tool. In another embodiment, the controller includes memory configured to store a set of program instructions, wherein the one or more processors are configured to execute the set of program instructions. In another embodiment, the set of program instructions are configured to cause the one or more processors to receive a plurality of reference images of the wafer. In another embodiment, the set of program instructions are configured to cause the one or more processors to receive the plurality of test images of the wafer. In another embodiment, the set of program instructions are configured to cause the one or more processors to align the plurality of reference images and the plurality of test images via a coarse alignment process. In another embodiment, the set of program instructions are configured to cause the one or more processors to align the plurality of reference images and the plurality of test images via a fine alignment process after alignment via the coarse alignment process. In another embodiment, the fine alignment process includes measuring individual offsets and correcting individual offset data between at least one of the plurality of reference images and the plurality of test images.

A method is disclosed, in accordance with one or more embodiments of the present disclosure. In one embodiment, the method may include, but is not limited to, receiving a plurality of reference images of a wafer. In another embodiment, the method may include, but is not limited to, receiving a plurality of test images of the wafer. In another embodiment, the method may include, but is not limited to, aligning the plurality of reference images and the plurality of test images via a coarse alignment process. In another embodiment, the method may include, but is not limited to, aligning the plurality of reference images and the plurality of test images via a fine alignment process after alignment via the coarse alignment process. In another embodiment, the fine alignment process includes measuring individual offsets and correcting individual offset data between at least one of the plurality of reference images and the plurality of test images.

BRIEF DESCRIPTION OF THE DRAWINGS

The numerous advantages of the disclosure may be better understood by those skilled in the art by reference to the accompanying figures in which:

FIG. 4A illustrates a graph of X-direction offset values (Y axis) for RTA blocks and a median offset from one sensor swath before correction via a fine alignment process, in accordance with one or more embodiments of the present disclosure;

FIG. 4B illustrates a graph of X-direction offset values (Y axis) for RTA blocks from one sensor swath after correction via a fine alignment process, in accordance with one or more embodiments of the present disclosure;

FIG. 4C illustrates a graph of X-direction offset range (Y axis) for RTA blocks before correction via a fine alignment process, in accordance with one or more embodiments of the present disclosure;

FIG. 4D illustrates a graph of X-direction offset range (Y axis) for RTA blocks after correction via a fine alignment process, in accordance with one or more embodiments of the present disclosure;

FIG. 5C illustrates a graph of Y-direction offset range (Y axis) for RTA blocks before correction via a fine alignment process, in accordance with one or more embodiments of the present disclosure;

FIG. 5D illustrates a graph of Y-direction offset range (Y axis) for RTA blocks after correction via a fine alignment process, in accordance with one or more embodiments of the present disclosure;

FIG. 6A illustrates a graph of X-direction alignment offset values (Y axis) for RTA blocks for a top sensor and a bottom sensor before correction via a fine alignment process, in accordance with one or more embodiments of the present disclosure;

FIG. 6B illustrates a graph of X-direction alignment offset values (Y axis) for RTA blocks for a top sensor and a bottom sensor after correction via a fine alignment process, in accordance with one or more embodiments of the present disclosure;

DETAILED DESCRIPTION OF THE INVENTION

Reference will now be made in detail to the subject matter disclosed, which is illustrated in the accompanying drawings.

Referring generally to FIGS. 1A-11, a system and method for aligning semiconductor device reference images and test images are described, in accordance with one or more embodiments of the present disclosure.

Embodiments of the present disclosure are directed to a system and method for aligning semiconductor device reference images and test images via a coarse alignment step and a fine alignment step. Embodiments of the present disclosure are also directed to a system and method for measuring offsets of runtime alignment (RTA) blocks from selected optical scan and wafer arrangements (e.g., same optical scan, different optical scans, optical scan/design data, same die row, different die rows, same wafer, different wafers, or the like). Embodiments of the present disclosure are also directed to a system and method for measuring individual offset using alignment targets. Embodiments of the present disclosure are also directed to a system and method for correcting individual alignment errors using individual offset measurements on an entire swath from multiple sensor swaths. Embodiments of the present disclosure are also directed to a system and method for correcting for optical distortion between reference images and test images. Embodiments of the present disclosure are directed to a system and method for adjusting semiconductor devices based on generated correctables, the correctables generated based on defects determined following the alignment of reference images and test images.

Figure 1A:
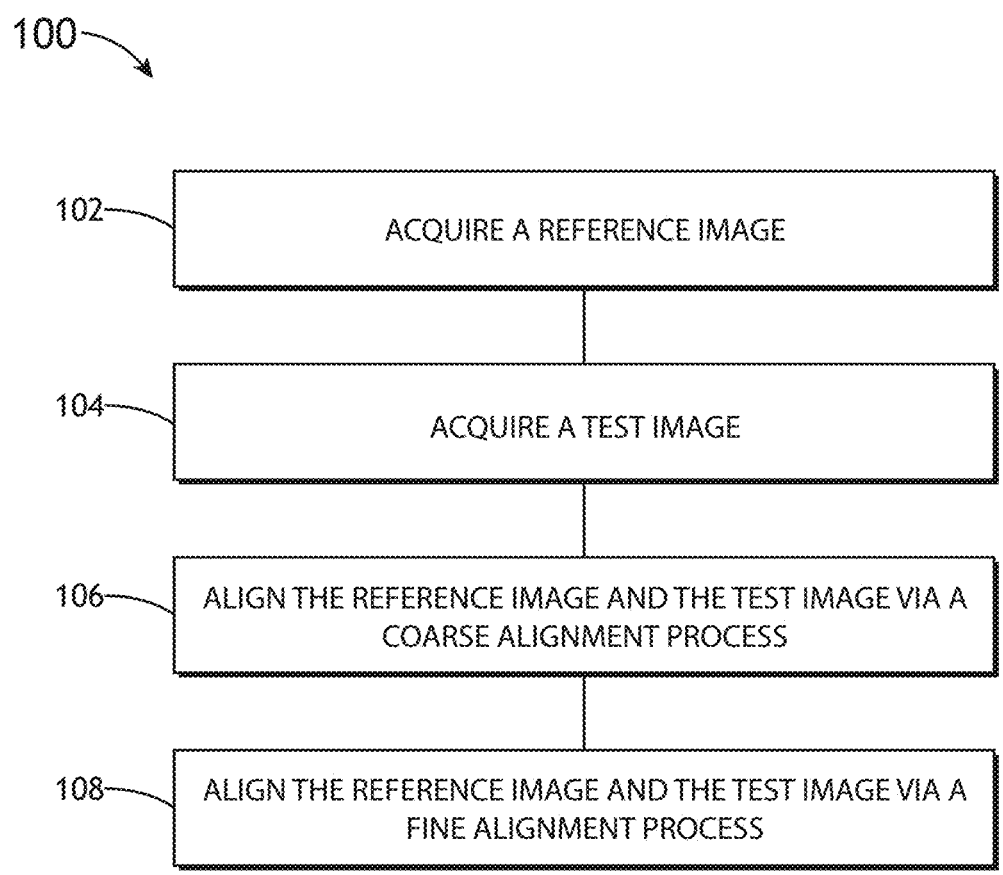
FIG. 1A illustrates a process flow diagram depicting a method to align semiconductor device reference images and test images, in accordance with one or more embodiments of the present disclosure.
Figure 1B:
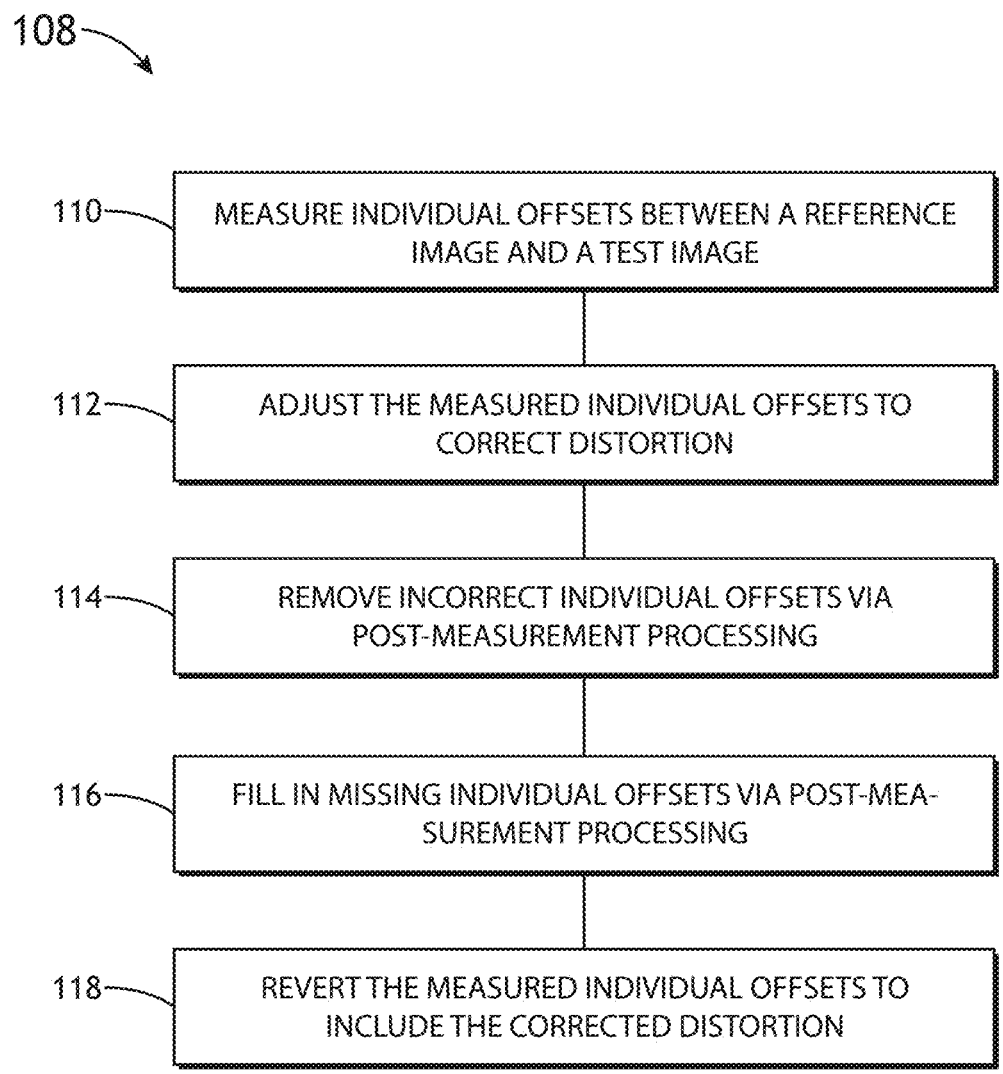
FIG. 1B illustrates a process flow diagram depicting a method to align semiconductor device reference images and test images via a fine alignment process, in accordance with one or more embodiments of the present disclosure.

FIGS. 1A and 1B generally illustrate a process flow diagram depicting a method 100 to align semiconductor device reference images and test images, in accordance with one or more embodiments of the present disclosure. It is noted herein the method 100 is not limited to the steps provided. For example, the method 100 may instead include more or fewer steps. By way of another example, the method 100 may perform the steps in an order other than provided. Therefore, the above description should not be interpreted as a limitation on the scope of the present disclosure, but merely an illustration.

In step 102, a reference image is received. In step 104, a test image is received. In one embodiment, the reference image and/or the test image includes one or more swath images of a semiconductor wafer. For example, a swath image may be obtained via a single left-to-right scan of the wafer. By way of another example, a swath image may be obtained via a single right-to-left scan of the wafer. It is noted herein a swath image includes one or more images of multiple dies, for purposes of the present disclosure. In addition, it is noted herein that each die image includes multiple frame images, for purposes of the present disclosure.

In another embodiment, the reference image and the test image are optical images acquired during the same scan (e.g., acquired when performing die-to-die (D2D) inspection) of a wafer. In another embodiment, the reference image is acquired during a first scan (e.g., golden reference) of a first wafer and the test image is an optical image acquired during a second scan (e.g., scans acquired when performing Standard Reference Die (SRD) inspection) of a second wafer. SRD inspection is generally described in U.S. Pat. No. 7,796,804, issued on Sep. 14, 2010, incorporated herein in the entirety. In another embodiment, the reference image is generated from semi-conductor design data and the test image is an optical image acquired during a scan (e.g., when performing pattern-to-design alignment (PDA)) of a wafer. PDA inspection is generally described in WIPO Pat. Pub. No. WO2016149690, published on Sep. 22, 2016, incorporated herein in the entirety. In another embodiment, the reference image includes a golden reference generated from a scan of a first die row of the wafer, and the test image is generated from a scan of a second die row of the wafer. In another embodiment, the reference image is generated from a scan of a first wafer, and the test image is generated from a scan of a second wafer. In another embodiment, the reference image and the test image are misaligned. For example, the reference image and the test image may be misaligned due to stage uncertainty, sensor jitter, pixel shifts, or the like.

In step 106, the reference image and the test image are aligned via a coarse alignment process. In one embodiment, the coarse alignment (or global alignment) process measures the offset between two images of the entirety of a swath or select zones of a swath. For example, the coarse alignment process may measure offsets between images from the same scan. By way of another example, the coarse alignment process may measure offsets between a golden reference and a test image. In another embodiment, the coarse alignment process may measure offsets between images rendered from semiconductor design data and an optical test image.

In another embodiment, the coarse alignment process aligns the reference image and the test image to within ±one pixel. For example, alignment targets may be used to measure the offset of two images. For instance, corners and/or locations of high gradient in both the X-direction and the Y-direction are identified from a swath to represent alignment targets, and a coarse alignment offset is then measured at each target. In addition, a cluster center of all offsets is identified via a clustering process (e.g., work unit) as the offset between the reference image and test image for the swath. By way of another example, zone-based offsets may be generated when processing the coarse alignment offsets on a per-swath basis via the work unit clustering process. In another embodiment, the coarse alignment utilizes one target per frame when measuring alignment offsets. In another embodiment, the coarse alignment process utilizes a larger search range selected to cover stage uncertainty. It is noted herein that selecting a larger search range to include stage uncertainty may result in fewer targets being qualified for the coarse alignment process. For example, targets are not qualified for offset measurement if they reside in areas of repeating patterns, such as array regions. In this regard, the alignment offsets for the entirety of a swath and/or select zones of a swath may not be sufficiently accurate, as the offsets from sparse targets may not represent the fine image displacement adequately. Coarse alignment of a reference image and a test image is generally described in WIPO Pat. Pub. No. WO2016149690, published on Sep. 22, 2016, previously incorporated herein in the entirety; and in Chris Harris and M. Stephens, *A Combined Corner and Edge Detector*, Proceedings of the 4th Alvey Vision Conference, pp. 147-51 (1988), incorporated herein in the entirety.

In step 108, the reference image and the test image are aligned via a fine alignment process. In one embodiment, the fine alignment process includes a refinement process following the coarse alignment process of step 106. In another embodiment, the fine alignment process utilizes a greater number of targets than a coarse alignment process. In another embodiment, the fine alignment process corrects individual offset data. In another embodiment, the fine alignment process measures residual offsets between the reference image and the test image. In another embodiment, the reference image and the test image are combined and processed. For example, offsets may be processed after combining data obtained from different time-delay integration (TDI) sensors from the same image swath. For instance, the alignment offsets across different sensors of the same swath may have a same shift based on sensor layout within a characterization tool (e.g., inspection tool, review tool, or the like).

In another embodiment, the search range for the fine alignment process is smaller than the search range for the coarse alignment process of step 106. For example, the search range for the fine alignment process may be ±one pixel. In this regard, a greater number of targets are usable for the fine alignment process than for the coarse alignment process. For example, the targets may include, but are not limited to, targets on repeating patterns in an array structure.

In another embodiment, the fine alignment process produces more accurate image offsets than a coarse alignment process. For example, the fine alignment process may align the reference image and the test image with an alignment accuracy of ±0.05 pixels (3 sigma) anywhere on the semiconductor device, while the coarse alignment process may align the reference image and the test image with only an alignment accuracy of ±one pixel (3 sigma) anywhere on the semiconductor device.

In another embodiment, the fine alignment process of step 108 includes a number of sub-steps. For example, as illustrated in FIG. 1B, the fine alignment process of step 108 may include all of steps 110, 112, 114, 116, and 118. By way of another example, the fine alignment process of step 108 may include steps 110, 114, and 116, such that the fine alignment process of step 108 may correct distortion in the one or more individual offset measurements, as described in step 112 and/or re-introduce the previously-corrected distortion, as described in step 118. More generally, the fine alignment process of step 108 may include any of steps 110, 112, 114, 116, and/or 118. Therefore, the above description should not be interpreted as a limitation on the scope of the present disclosure, but merely an illustration.

In step 110, one or more individual offsets are measured between the reference image and the test image. In one embodiment, the reference image and/or the test image is divided into multiple run-time alignment (RTA) blocks. In another embodiment, where an alignment target is available, an offset for each area of a RTA block is measured at the target location. In another embodiment, where an alignment target is not available, an offset is measured for the block.

In step 112, the individual offset measurements are adjusted to correct (e.g., remove) optical distortion between the reference image and the test image. In one embodiment, offsets across the sample stage in an X-direction change due to image jitter. In another embodiment, optical distortion is measured in the reference image and/or the test image. For example, optical distortion may be measured from two scans during SRD inspection (e.g., an SRD training scan to generate a golden reference when a mask is fresh, and an SRD detection scan to detect repeaters when the mask has deteriorated a select amount).

Figure 2:
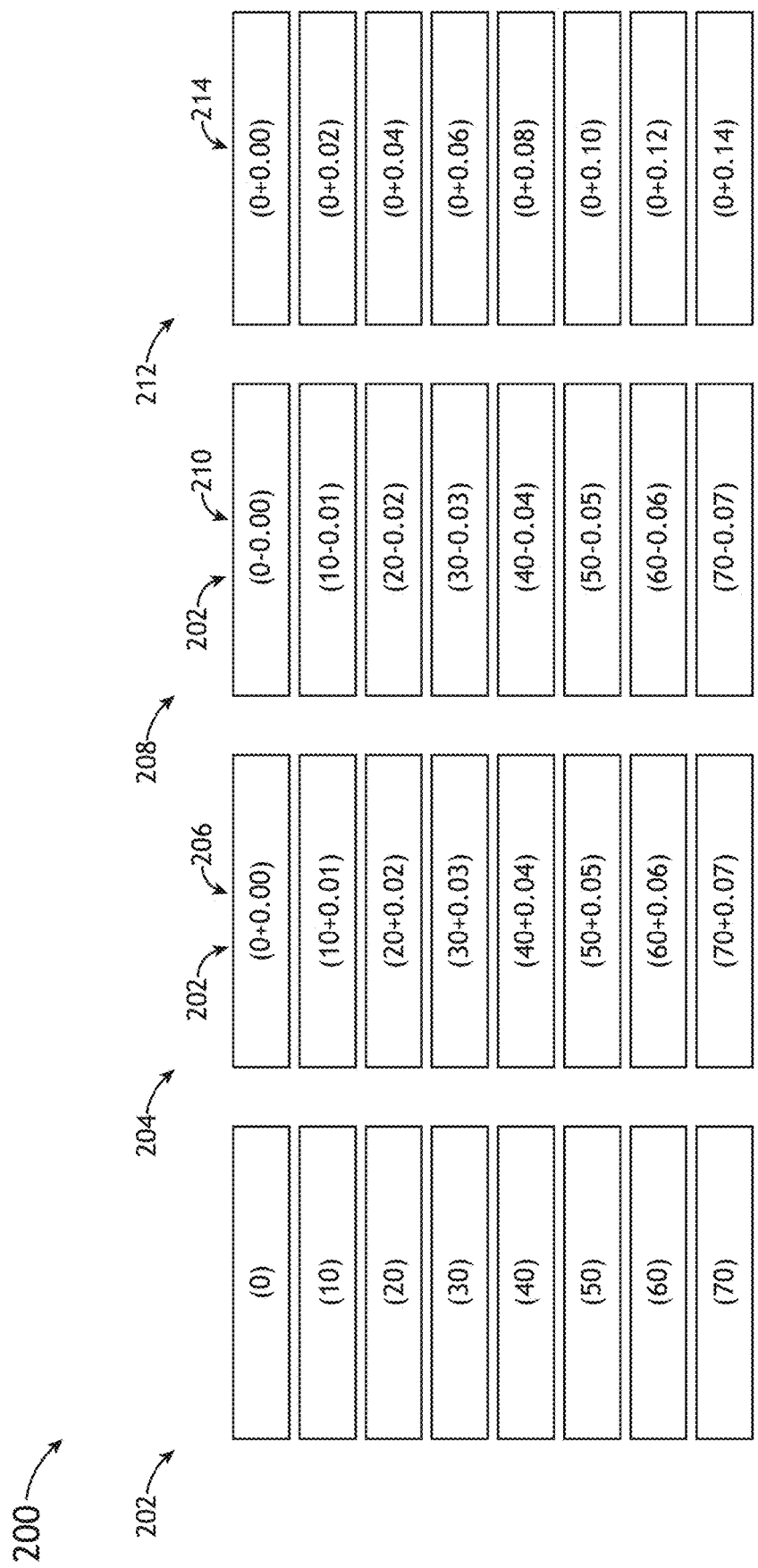
FIG. 2 illustrates a layout of ideal coordinates and coordinate offsets for a reference image and a test image, in accordance with one or more embodiments of the present disclosure.

FIG. 2 illustrates a layout 200 of ideal coordinates and coordinate offsets 212 for a reference image and a test image, in accordance with one or more embodiments of the present disclosure. In one embodiment, each rectangle in FIG. 2 represents a RTA block. In another embodiment, the layout 200 includes ideal coordinate data 202 in the Y-direction. In another embodiment, reference image data (e.g., golden reference image data) 204 gathered during a training scan includes the ideal coordinate data 202 (e.g., before the + sign) and reference distortion data (e.g., after the + sign) 206. In another embodiment, test image data 208 gathered during RTA includes the ideal coordinate data 202 (e.g., before the − sign) and test distortion data 210 (e.g., after the − sign). In another embodiment, optical distortion 214 is a combination (e.g., subtraction) of the reference distortion data 206 and the test distortion data 210.

In another embodiment, the sensor distortion in the Y-direction is adjusted by correcting the difference of the optical distortion. It is noted herein that optical distortion is a vector including an X-direction and a Y-direction component. In addition, it is noted herein that distortion offsets exist across the Y-direction component of the sensor height. Further, it is noted herein that if distortion is adjusted in the Y-direction, offset measurements taken at the same X-direction component of the stage location across different scans may be assumed to have a similar or substantially equal value (e.g., ±0.05 pixel alignment accuracy).

In one embodiment, the individual offset measurements are processed via post-measurement processing. For example, the individual offset measurements may be processed as a whole swath. For instance, the individual offset measurements may be processed via mathematical analysis including, but not limited to, normalized cross correlation (NCC), sum squared difference (SSD), projected-based processing, or the like. In step 114, the post-measurement processing removes or corrects one or more individual offset errors (e.g., outliers) measured for all RTA blocks. In step 116, the post-measurement processing fills in one or more individual offsets (e.g., one or more individual offsets missing due to lack of features) for all RTA blocks.

Figure 3:
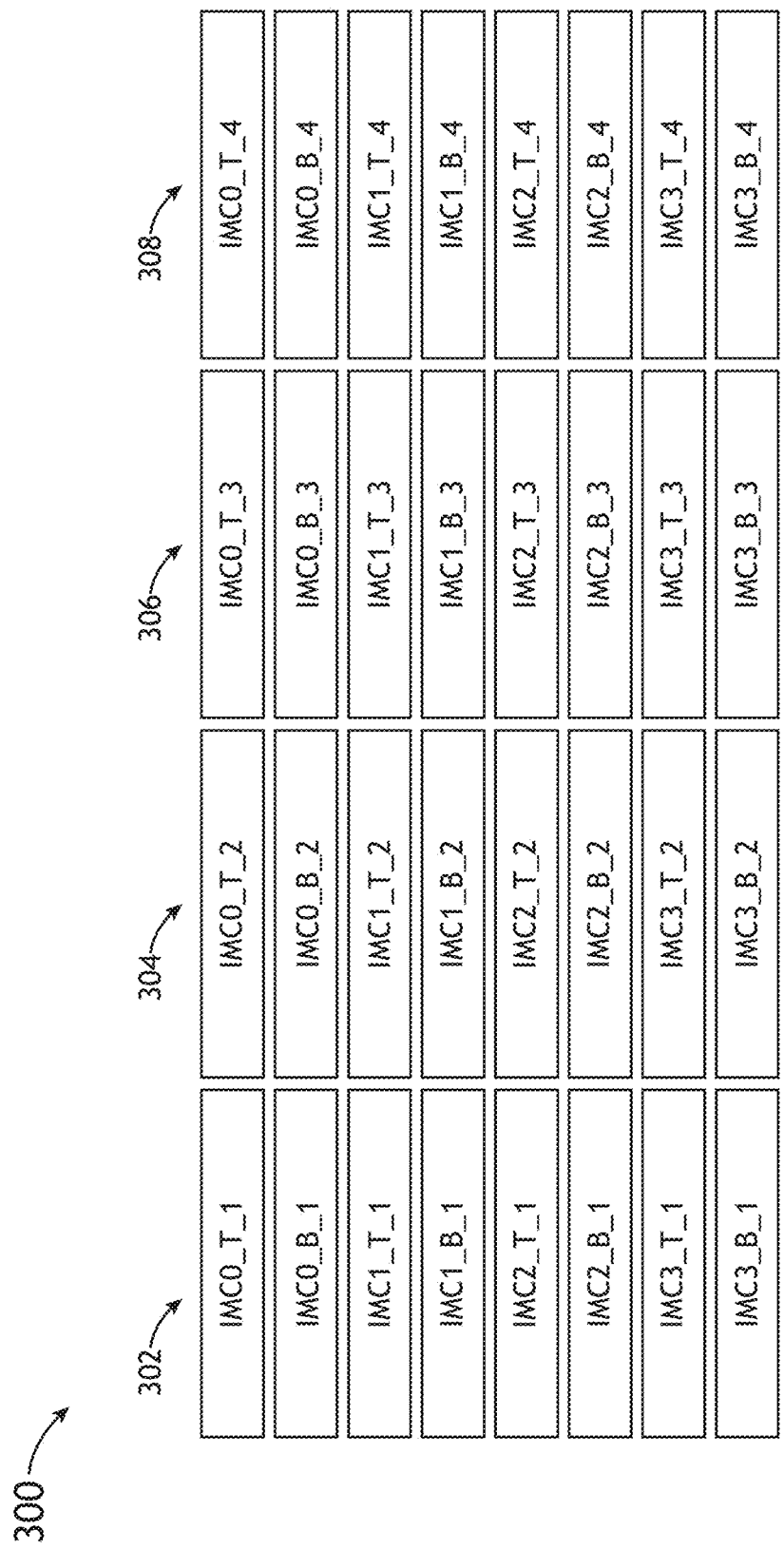
FIG. 3 illustrates a layout of runtime alignment (RTA) blocks on four image frames across a sensor swath, in accordance with one or more embodiments of the present disclosure.

FIG. 3 illustrates a layout 300 of RTA blocks of four image frames across a sensor swath, in accordance with one or more embodiments of the present disclosure. In one embodiment, the layout 300 includes RTA block 302 (e.g., including IMC0_T_1-IMC3_B_1), RTA block 304 (e.g., including IMC0_T_2-IMC3_B_2), RTA block 306 (e.g., including IMC0_T_3-IMC3_B_3), and RTA block 308 (e.g., including IMC0_T_4-IMC3_B_4), where each RTA block has the same X-direction component for the sensor location. In another embodiment, offsets from blocks with the same X-direction component for the sensor location have similar, or substantially equal, values (e.g., ±0.05 pixel alignment accuracy) if the optical distortion in the individual offset measurements is adjusted across the Y-direction component of the sensor height via the process of step 112. In another embodiment, the median of the eight offsets per block (e.g., RTA blocks 302, 304, 306, 308) is determined. It is noted herein the median change in a neighboring RTA block in an X-direction may be caused by system jitter. In another embodiment, a consistency value of the eight offsets is determined.

In another embodiment, the determined median values for the RTA blocks 302, 304, 306, 308 are processed to remove incorrect offsets (e.g., outliers) via step 114 and/or are processed to fill in missing offsets via step 116. For example, an incorrect median value may be replaced via one or more interpolation and/or one or more extrapolation processes. By way of another example, incorrect offsets may be replaced with the determined median. In another embodiment, the processing of the determined median values is performed by processing offsets in a small range across an X location of a swath. For example, the processing may be performed based on image jitter frequency and/or while considering the consistency value across a TDI height (e.g., a Y location). In another embodiment, the processing of the determined median values takes into account that a top sensor and/or a bottom sensor of a characterization tool (e.g., inspection tool, review tool, or the like) being implemented have a fixed amount of position shift. For example, the top and bottom sensor may include a shift of several RTA blocks in the X-direction.

It is noted herein that the layout 300 is not limited to four image frames across a sensor swath. For example, the layout 300 may include one to twelve sensors. By way of another example, each sensor may correspond to one to twelve image frames. More generally, the layout 300 may include any number of sensors, where each sensor may correspond to any number of image frames and each image frame may include any number of RTA blocks. Therefore, the above description should not be interpreted as a limitation on the scope of the present disclosure, but merely an illustration.

Although embodiments of the present disclosure are directed to processing calculated median values to remove incorrect offsets and/or fill in missing offsets, it is noted herein that alternative statistical analyses and/or alternative statistical operations may be performed, and the resultant values processed, to remove incorrect offsets and/or fill in missing offsets. For example, outliers may be filled in and/or removed by calculating a standard deviation and/or an average of the outliers. By way of another example, outliers may be filled in and/or removed via a trend analysis on the median offset values. For instance, a reasonable long period of median offsets within the image jitter frequency are considered as good median offset values. Therefore, the above description should not be interpreted as a limitation on the scope of the present disclosure, but merely an illustration.

Although embodiments of the present disclosure are directed to combining and processing a single reference image (e.g., a/the reference image) and a single test image (e.g., a/the test image), it is noted herein that multiple reference images and/or multiple test images may be combined together and processed to determine offsets within the images. Therefore, the above description should not be interpreted as a limitation on the scope of the present disclosure, but merely an illustration.

In step 118, the distortion correction applied to the individual offset measurements is reverted to re-include the optical distortion values after the processing of the one or more individual offset measurements has occurred (e.g., the correcting of individual RTA block offsets, per step 114, and/or the filling in of missing individual offset measurements, per step 116). For example, re-inserting the optical distortion values may interpolate/align the actual (distorted) images.

In another embodiment, the fine alignment process of step 108 includes measuring alignment offset based on one or more alignment targets. In another embodiment, the fine alignment process of step 108 includes aligning the reference image and the test image via a fine alignment process by using individual measured offsets from one or more multiple sensor swaths.

FIGS. 4A-4D generally illustrate the effect the fine alignment process of step 108 has on offset value of the RTA blocks, in accordance with one or more embodiments of the present disclosure. In one embodiment, FIG. 4A illustrates a graph 400 of X-direction offset values (Y axis) for RTA blocks before fine alignment correction. For example, eight locations 402, 404, 406, 408, 410, 412, 414, 416 correspond to eight RTA block rows, as illustrated in FIGS. 2 and 3. By way of another example, a median 418 is computed for one sensor swath. In another embodiment, FIG. 4B illustrates a graph 420 of X-direction offset values (Y axis) for RTA blocks after fine alignment correction. For example, the eight locations 402, 404, 406, 408, 410, 412, 414, 416 correspond to the eight RTA block rows as illustrated in FIGS. 2 and 3. As illustrated by the comparison between FIGS. 4A and 4B, the fine alignment correction process of step 108 removes incorrect offsets (e.g., see location 408, RTA blocks 19-26) and/or fills in missing offsets for RTA blocks along an X-direction, considerably reducing the alignment offset range for the RTA blocks.

In another embodiment, FIG. 4C illustrates a graph 440 of the range 442 of X-direction offset values (Y axis) versus RTA blocks before fine alignment correction. In another embodiment, FIG. 4D illustrates a graph 460 of the range 462 of X-direction offset values (Y axis) versus RTA blocks after fine alignment correction. As illustrated by the comparison between FIGS. 4C and 4D, the fine alignment correction process of step 108 removes incorrect offsets (e.g., see location 408, RTA blocks 19-26) and/or fills in missing offsets for RTA blocks along a X-direction, considerably reducing the alignment offset range for the RTA blocks.

Figure 5A:
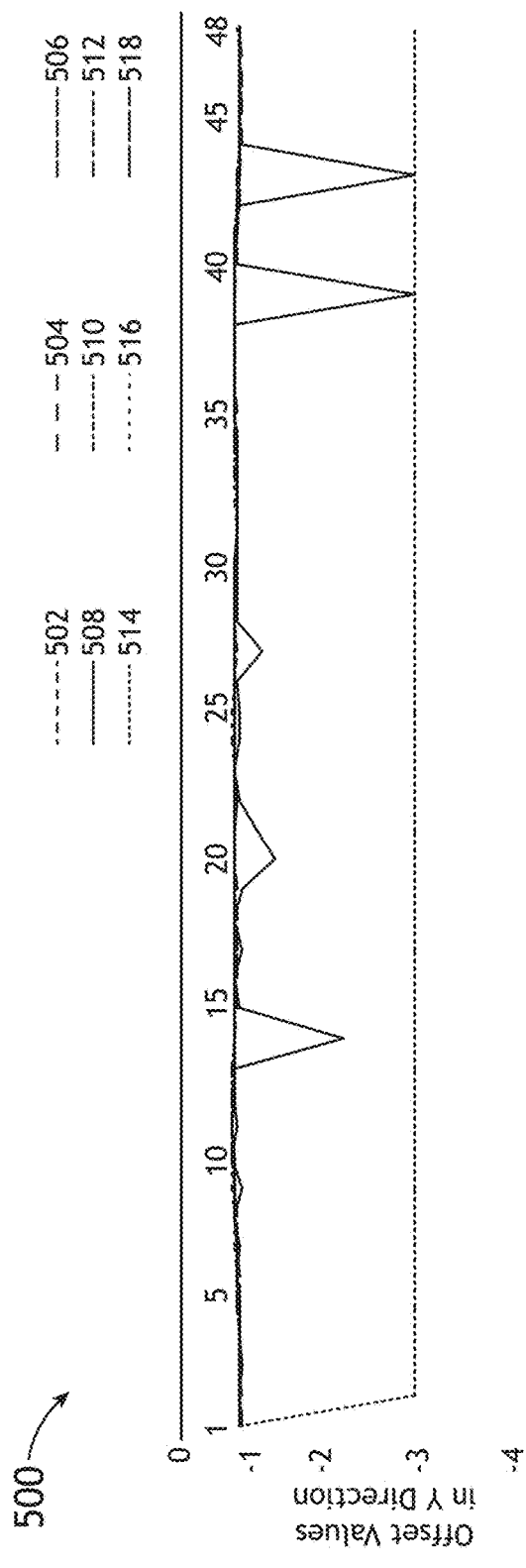
FIG. 5A illustrates a graph of Y-direction offset values (Y axis) for RTA blocks and a median offset from one sensor swath before correction via a fine alignment process, in accordance with one or more embodiments of the present disclosure.
Figure 5B:
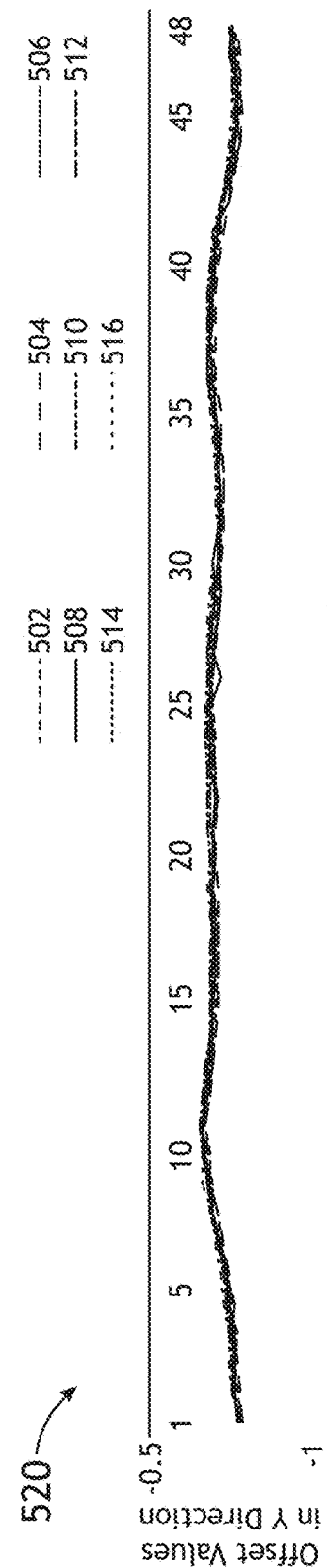
FIG. 5B illustrates a graph of Y-direction offset values (Y axis) for RTA blocks from one sensor swath after correction via a fine alignment process, in accordance with one or more embodiments of the present disclosure.

FIGS. 5A-5D generally illustrate the effect the fine alignment process of step 108 has on offset value of the RTA blocks, in accordance with one or more embodiments of the present disclosure. In one embodiment, FIG. 5A illustrates a graph 500 of Y-direction offset values (Y axis) for RTA blocks before fine alignment correction. For example, eight locations 502, 504, 506, 508, 510, 512, 514, 516 correspond to eight RTA blocks in the Y-direction, as illustrated in FIGS. 2 and 3. By way of another example, a median 518 is computed for one sensor swath. In another embodiment, FIG. 5B illustrates a graph 520 of Y-direction offset values (Y axis) for RTA blocks after fine alignment correction. For example, the eight locations 502, 504, 506, 508, 510, 512, 514, 516 correspond to the eight RTA block rows as illustrated in FIGS. 2 and 3. As illustrated by the comparison between FIGS. 5A and 5B, the fine alignment correction process of step 108 removes incorrect offsets (e.g., see location 508, RTA blocks 14, 20, 27, 39, 43) and/or fills in missing offsets for RTA blocks along a Y-direction, considerably reducing the alignment offset range for the RTA blocks.

In another embodiment, FIG. 5C illustrates a graph 540 of the range 542 of Y-direction offset values (Y axis) versus RTA blocks before fine alignment correction. In another embodiment, FIG. 5D illustrates a graph 560 of the range 562 of Y-direction offset values (Y axis) versus RTA blocks after fine alignment correction. As illustrated by the comparison between FIGS. 5C and 5D, the fine alignment correction process of step 108 removes incorrect offsets (e.g., see location 508, RTA blocks 14, 20, 27, 39, 43) and/or fills in missing offsets for RTA blocks along a Y-direction, considerably reducing the alignment offset range for the RTA blocks.

FIGS. 6A-6B generally illustrate the effect the fine alignment process of step 108 has on offset value of the RTA blocks, in accordance with one or more embodiments of the present disclosure. In one embodiment, FIG. 6A illustrates a graph 600 of X-direction alignment offset values (Y axis) for RTA blocks for a top sensor 602 and a bottom sensor 604 before fine alignment correction. For example, the majority of offset values are close to the zero value, but a select set of offsets (spikes) are not measured correctly, resulting in offset values close to three. In another embodiment, FIG. 6B illustrates a graph 610 of X-direction alignment offset values (Y axis) for RTA blocks for a top sensor 602 and a bottom sensor 604 after fine alignment correction. As illustrated by the comparison between FIGS. 6A and 6B, the fine alignment correction process of step 108 removes incorrect offsets and/or fills in missing offsets for RTA blocks along an X-direction, considerably reducing the alignment offset range for the RTA blocks.

Figures 7A, 7B:
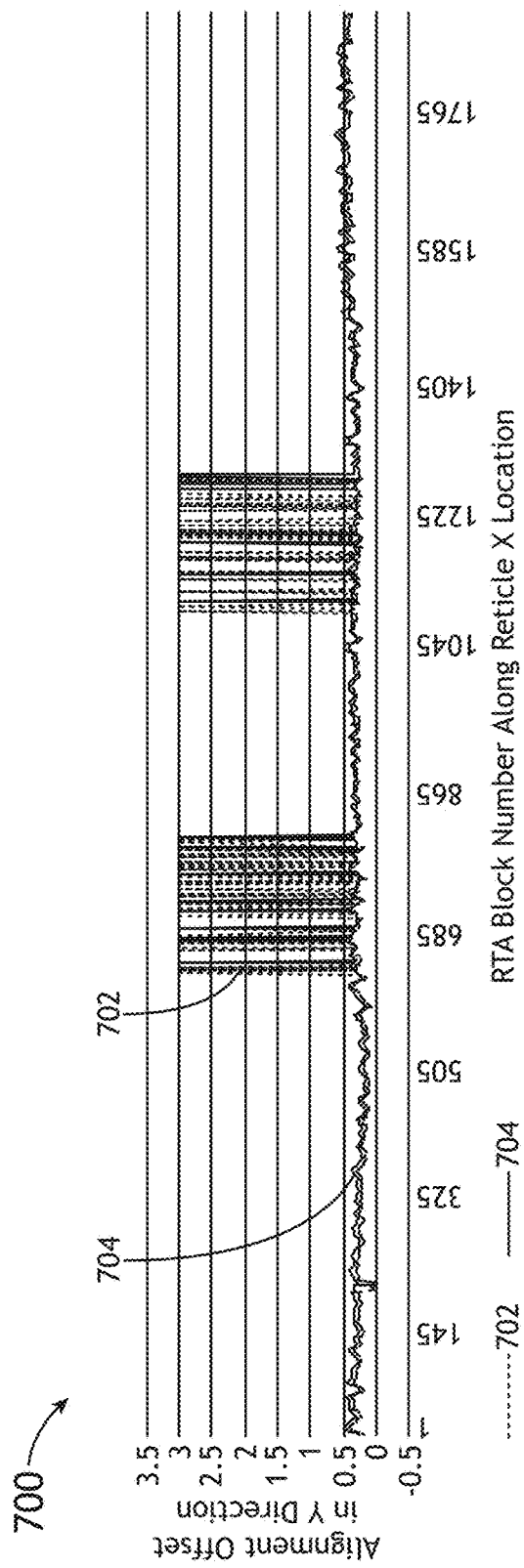
FIG. 7A illustrates a graph of Y-direction alignment offset values (Y axis) for RTA blocks for a top sensor and a bottom sensor before correction via a fine alignment process, in accordance with one or more embodiments of the present disclosure.
FIG. 7B illustrates a graph of Y-direction alignment offset values (Y axis) for RTA blocks for a top sensor and a bottom sensor after correction via a fine alignment process, in accordance with one or more embodiments of the present disclosure.

FIGS. 7A-7B generally illustrate the effect the fine alignment process of step 108 has on offsets values of the RTA blocks, in accordance with one or more embodiments of the present disclosure. In one embodiment, FIG. 7A illustrates a graph 700 of Y-direction alignment offset values (Y axis) for RTA blocks for a top sensor 702 and a bottom sensor 704 before fine alignment correction. For example, the majority of offset values are close to the zero value, but a select set of offsets (spikes) are not measured correctly, resulting in values close to three. In another embodiment, FIG. 7B illustrates a graph 710 of median Y-direction alignment offset values (Y axis) for RTA blocks for a top sensor 702 and a bottom sensor 704 after fine alignment correction. As illustrated by the comparison between FIGS. 7A and 7B, the fine alignment correction process of step 108 removes incorrect offsets and/or fills in missing offsets for RTA blocks along an X-direction, considerably reducing the alignment offset range for the RTA blocks.

Figure 8:
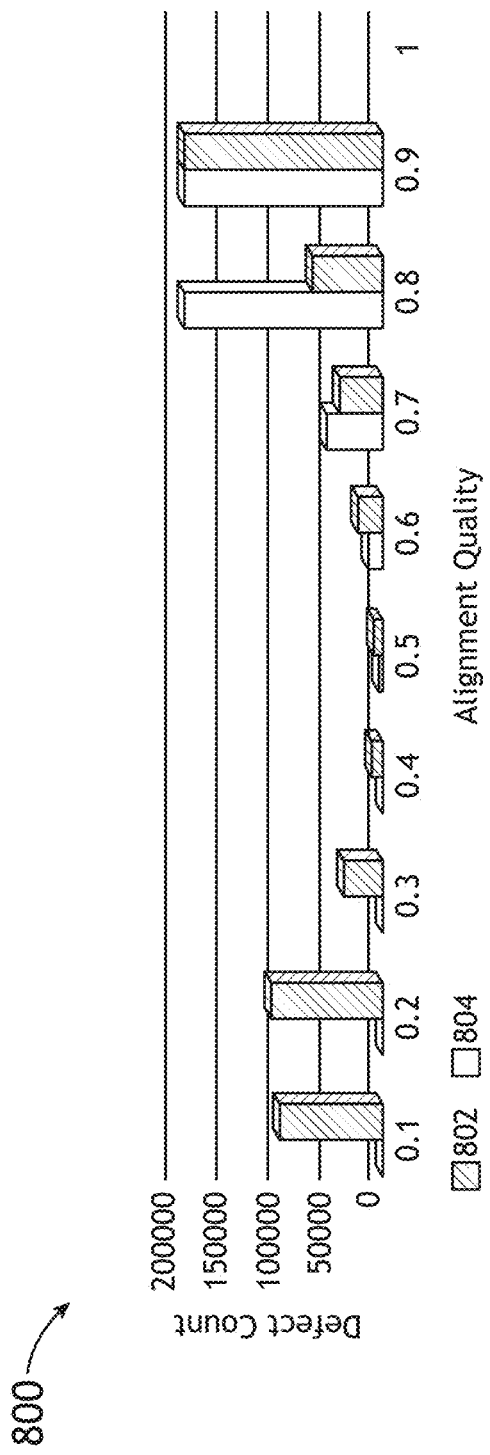
FIG. 8 illustrates a graph comparing defect count to alignment quality where fine alignment processing is either implemented or not implemented following coarse alignment processing, in accordance with one or more embodiments of the present disclosure.

It is noted herein that performing the fine alignment process of step 108 (with possible sub-steps 110, 112, 114, 116, and/or 118) may provide a number of benefits for multiple types of inspection. For example, the fine alignment process of step 108 (with possible sub-steps 110, 112, 114, 116, and/or 118) may allow for the alignment of a golden reference and test optical images across two different scans of two different wafers when performing SRD inspection. For example, the golden reference image and the test image may be obtained from different scans and different wafers. If the offset between the golden reference image and the test image is large, image alignment may be achieved via coarse alignment and fine alignment. It is noted herein that coarse alignment calculates the global offset, while fine alignment calculates the offset for much smaller areas (e.g., RTA blocks) with great accuracy. For instance, a golden reference and a test optical image may be compared and aligned for a particular array region of the semiconductor device. In addition, the fine alignment process may be utilized during a SRD training scan to generate a golden reference from images of multiple reticles and/or a SRD detection scan to detect repeaters when the mask has deteriorated a select amount. FIG. 8 illustrates a graph 800 comparing defect count to alignment quality where fine alignment processing is utilized (e.g., data 802) or is not utilized (e.g., data 804) following coarse alignment processing, in accordance with one or more embodiments of the present disclosure. It is noted herein that, for purposes of the present disclosure, alignment quality is a normalized value ranging from 0 to 1, where 1 indicates perfect alignment. As illustrated in FIG. 8, utilizing fine alignment processing reduces the number of defects at lower alignment quality.

By way of another example, the fine alignment process of step 108 (with possible sub-steps 110, 112, 114, 116, and/or 118) may allow for the comparing and alignment of synthetic images generated from semiconductor design data and a test optical image within a select region (e.g., array region) for accurate care area placement and/or defect location accuracy when performing design-based inspection.

By way of another example, the fine alignment process of step 108 (with possible sub-steps 110, 112, 114, 116, and/or 118) may correct wrong and/or missing alignment offsets and ease the burden of individual alignment offset measurement when performing D2D inspection, including when analyzing layers with large areas of repeating patterns (e.g., areas which hardware RTA processes (e.g., coarse alignment) have known issues).

By way of another example, the fine alignment process of step 108 (with possible sub-steps 110, 112, 114, 116, and/or 118) may allow for the alignment of all corresponding frames of wafer dies across a wafer, which is crucial when performing Repeater in Array (RIA) inspection processes. For instance, the fine alignment process may be implemented to first determine a robustly averaged frame before array inspection process. RIA inspection processes are generally described in U.S. Pat. Pub. No. 2016/0061749, published on Mar. 3, 2016, incorporated herein in the entirety.

Figure 9:
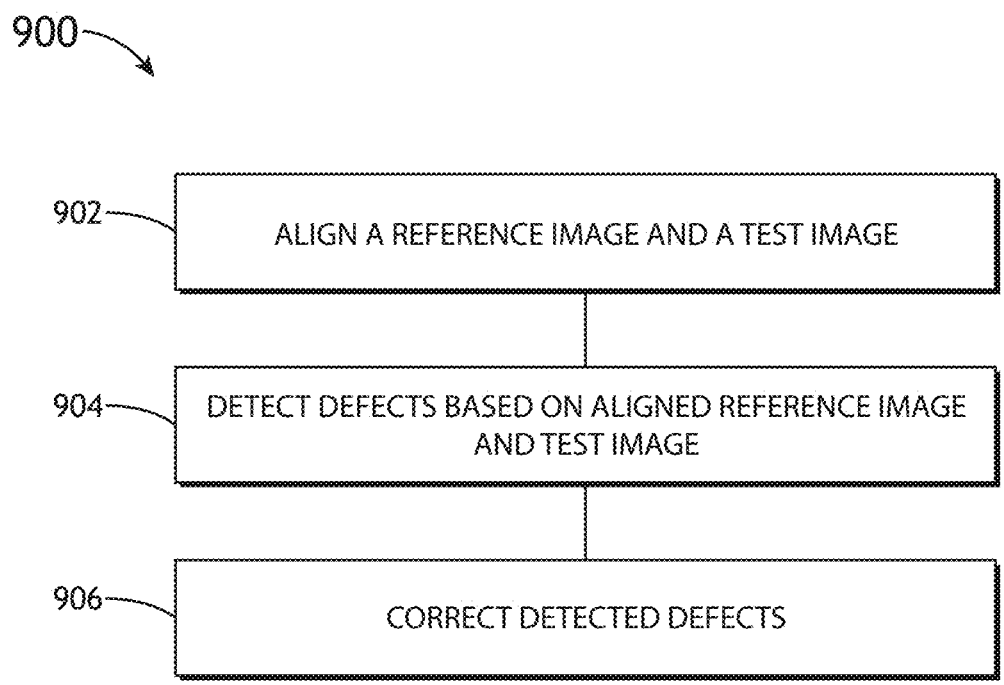
FIG. 9 illustrates a process flow diagram depicting a method to correct die errors based on defects detected in aligned optical images, in accordance with one or more embodiments of the present disclosure.

FIG. 9 illustrates a process flow diagram depicting a method 900 to correct die errors based on defects detected in aligned optical images, in accordance with one or more embodiments of the present disclosure. It is noted herein the method 900 is not limited to the steps provided. For example, the method 900 may instead include more or fewer steps. By way of another example, the method 900 may perform the steps in an order other than provided. Therefore, the above description should not be interpreted as a limitation on the scope of the present disclosure, but merely an illustration.

In step 902, a reference image and a test image are aligned. In one embodiment, the alignment of the reference image and the test image is performed via one or more steps of the method 100 as illustrated in FIG. 1 and described in the corresponding paragraphs above.

In step 904, defect detection is performed on a die based on results from the alignment of the reference image and the test image. In one embodiment, the defect detection results in one or more defects. In another embodiment, one or more correctables are determined in response to the one or more defects. For example, the one or more correctables may include one or more adjustments to one or more semiconductor fabrication tools to prevent and/or compensate for the detected defects at the defect location. By way of another example, the one or more correctables may include one or more adjustments to the placement of a care area, where the care area covers a semiconductor characterization tool (e.g., inspection tool, review tool, or the like) hot spot area in which killer defects are likely to exist. By way of another example, the one or more correctables may be determined by a controller.

In step 906, the detected defects are corrected. In one embodiment, the detected defects are attributable to one or more characterization tool errors (e.g., sensor alignment errors). In another embodiment, the detected defects are attributable to one or more semiconductor device fabrication tool errors (e.g., fabrication errors).

In another embodiment, the one or more correctables are transmitted via a feed forward loop to a fabrication tool or a characterization tool (e.g., inspection tool, review tool, or the like). For example, where the layer-depositing process of the fabrication tool is adjustable based on the one or more correctables, a layer may be adjusted based on the detected defects prior to depositing the same layer on a subsequent wafer. By way of another example, where the measuring process of the characterization tool is adjustable based on the one or more correctables, the alignment of the characterization tool sensor may be adjusted based on the detected defects prior to measuring the same layer on a subsequent wafer.

In another embodiment, the one or more correctables are transmitted via a feedback loop to a fabrication tool or a characterization tool. For example, where the layer-depositing process of the fabrication tool is adjustable based on the one or more correctables, a subsequent layer may be adjusted to compensate for detected defects in a previous layer on a wafer prior to depositing the subsequent layer on the wafer on which the previous layer was deposited. By way of another example, where the measuring process of the characterization tool is adjustable based on the one or more correctables, the alignment of the characterization tool sensor may be adjusted based on the detected defects prior to measuring a subsequent layer on the wafer on which the previous layer was deposited.

Figure 10:
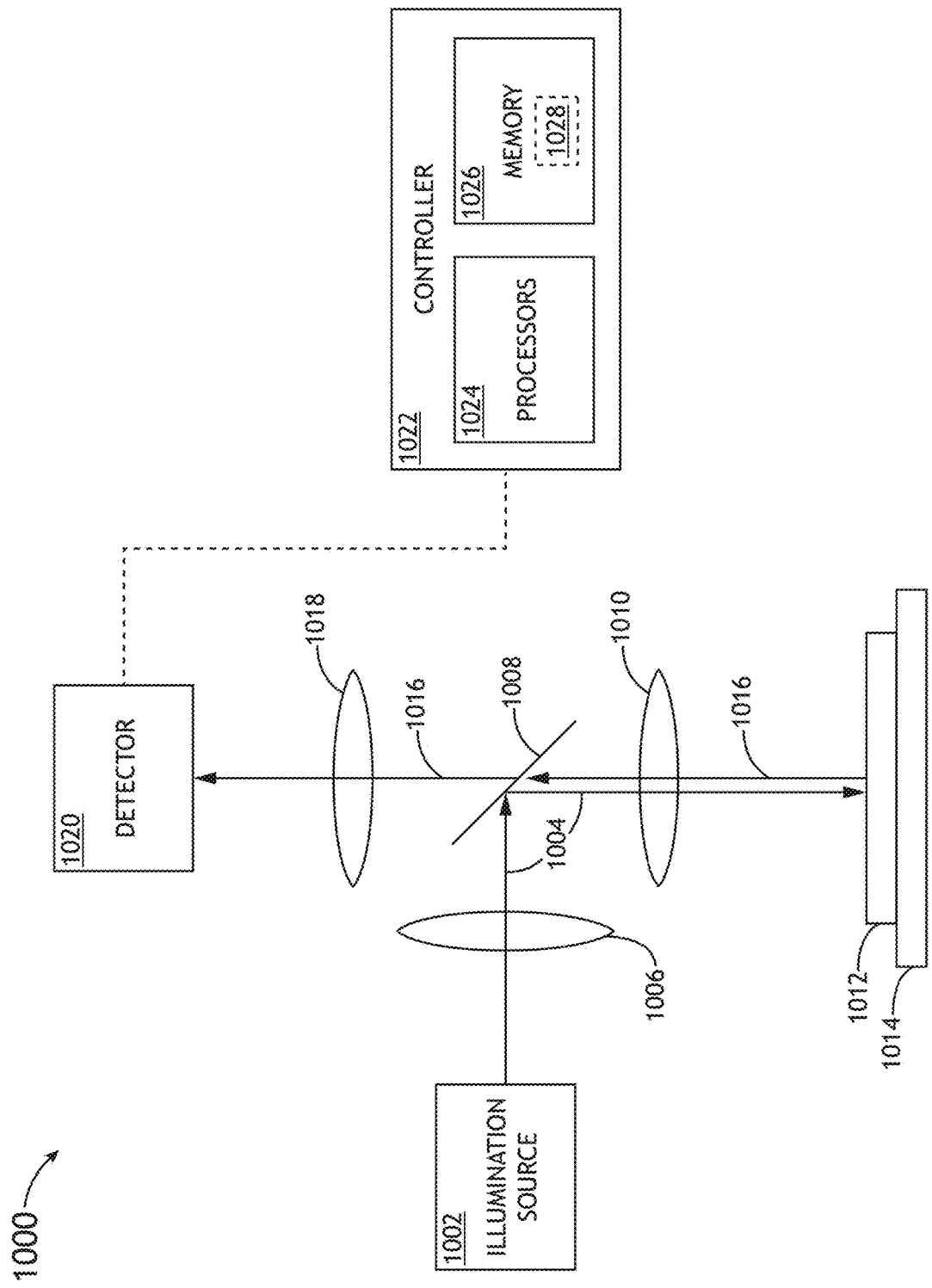
FIG. 10 illustrates a characterization tool for aligning semiconductor device reference images and test images, in accordance with one or more embodiments of the present disclosure.

FIG. 10 illustrates a characterization tool 1000 capable of performing one or more steps of the method 100 and/or one or more steps of the method 900, in accordance with one or more embodiments of the present disclosure.

The characterization tool 1000 may include any appropriate characterization tool known in the art. For example, the characterization tool 1000 may include, but is not limited to, an inspection tool or review tool. For instance, the inspection tool may include, but is not limited to, an optical inspection tool. Additionally, the optical inspection tool may include an optical inspection tool capable of generating one or more high-resolution images representing the electrical intent of a sample 1012. In addition, the optical inspection tool may include a broadband inspection tool including, but not limited to, a laser sustained plasma (LSP) based inspection tool. Further, the optical inspection tool may include a narrowband inspection tool, such as, but not limited to, a laser scanning inspection tool. Further, the optical inspection tool may include, but is not limited to, a brightfield inspection tool, or a darkfield inspection tool. It is noted herein that the characterization tool 1000 may include any optical tool configured to collect and analyze illumination reflected, scattered, diffracted, and/or radiated from the sample 1012. By way of another example, the characterization tool 1000 may include, but is not limited to including, a scanning electron microscopy (SEM) review tool. In a general sense, although not shown here, the characterization tool 1000 may include any characterization tool suitable for inspecting one or more wafers, reticles, or photomasks.

In one embodiment, the characterization tool 1000 includes an illumination source 1002. The illumination source 1002 may include any illumination source known in the art configured to generate radiation. For example, the illumination source 1002 may include, but is not limited to, a broadband illumination source (e.g., a Xenon lamp) or a narrowband illumination source (e.g., a laser). By way of another example, the illumination source 1002 may be configured to generate DUV, UV, VUV, and/or EUV illumination. For instance, the EUV illumination source may include a discharge produced plasma (DPP) illumination source or a laser produced plasma (LPP) illumination source configured to generate illumination in the EUV range. By way of another example, the illumination source 1002 may be configured to generate X-ray radiation.

In another embodiment, the illumination source 1002 may be operably coupled to a set of positioners configured to actuate the illumination source 1002 in one or more directions. For example, a controller 1022 may direct the set of positioners to translate the illumination source 1002 in one or more of an X-direction, a Y-direction, and/or a Z-direction to correct beam misalignment produced by any of the components of the characterization tool 1000.

In another embodiment, the illumination source 1002 generates and directs illumination 1004 (e.g., a beam of illumination) to the surface of the sample 1012 disposed on a sample stage 1014. For example, the illumination source 1002 may be configured to direct illumination 1004 to the surface of the sample 1012 disposed on the sample stage 1014 via one or more of a set of optical elements 1006, a beam splitter 1008, and/or a set of optical elements 1010. It is noted herein the set of optical elements 1006 and/or the set of optical elements 1010 may include any optical element known in the art suitable for focusing, suppressing, extracting, and/or directing the illumination 1004. In addition, it is noted herein the set of optical elements 1006, the beam splitter 1008, and the set of optical elements 1010 may be considered to be a set of focusing optics for purposes of the present disclosure.

The sample 1012 may include any sample suitable for inspection and/or review. In one embodiment, the sample 1012 includes a semiconductor wafer. As used through the present disclosure, the term "wafer" refers to a substrate formed of a semiconductor and/or a non-semiconductor material. For instance, in the case of a semiconductor material, the wafer may be formed from, but is not limited to, monocrystalline silicon, gallium arsenide, and/or indium phosphide. In another embodiment, the sample 1012 includes a photomask/reticle. As such, the term "wafer" and the term "sample" may be used interchangeably in the present disclosure. Therefore, the above description should not be interpreted as a limitation on the scope of the present disclosure but merely an illustration.

In another embodiment, where the sample 1012 is a wafer, the wafer 1012 is manufactured using one or more sets of wafer design data. In another embodiment, the sets of wafer design data include one or more sets of layers. For example, such layers may include, but are not limited to, a resist, a dielectric material, a conductive material, and a semi-conductive material. Many different types of such layers are known in the art, and the term wafer as used herein is intended to encompass a wafer on which all types of such layers may be formed. By way of another example, the layers formed on the wafer may be repeated one or more times within the wafer. Formation and processing of such layers of material may ultimately result in completed devices. Many different types of devices may be formed on a wafer, and the term wafer as used herein is intended to encompass a wafer on which any type of device known in the art is being fabricated.

While the fabrication, measurement, and alignment techniques described herein correspond generally to the sample 1012 being a semiconductor wafer, it is to be understood that the techniques are also applicable to other types of thin polished plates as well. For example, the one or more thin polished plates may include, but are not limited to, one or more magnetic disc substrates, one or more gauge blocks, or the like. As such, the term "wafer" and the term "thin polished plate" may be used interchangeably in the present disclosure. Therefore, the above description should not be interpreted as a limitation on the scope of the present disclosure but merely an illustration.

The sample stage 1014 may include any appropriate mechanical and/or robotic assembly known in the art of electron-beam microscopy. In one embodiment, the sample stage 1014 is an actuatable stage. For example, the sample stage 1014 may include, but is not limited to, one or more translational stages suitable for selectably translating the sample 1012 along one or more linear directions (e.g., X-direction, Y-direction, and/or Z-direction). By way of another example, the sample stage 1014 may include, but is not limited to, one or more rotational stages suitable for selectively rotating the sample 1012 along a rotational direction. By way of another example, the sample stage 1014 may include, but is not limited to, a rotational stage and a translational stage suitable for selectably translating the sample 1012 along a linear direction and/or rotating the sample 1012 along a rotational direction. By way of another example, the sample stage 1014 may be configured to translate or rotate the sample 1012 for positioning, focusing, and/or scanning in accordance with a selected inspection or metrology algorithm, several of which are known to the art.

In another embodiment, the characterization tool 1000 is configured to detect one or more defects in the sample 1012. In another embodiment, the characterization tool 1000 detects defects on the sample 1012 via one or more detectors 1020. The one or more detectors 1020 may include any detector known in the art. For example, the one or more detectors 1020 may include, but are not limited to, photomultiplier tubes (PMTs), charge coupled devices (CCDs), time-delay integration (TDI) cameras, or the like. In addition, the output of the one or more detectors 1020 may be operably coupled to the controller 1022.

In another embodiment, the sample 1012 reflects, scatters, diffracts, and/or radiates illumination 1016 (e.g., a beam of illumination) in response to the illumination 1004. In another embodiment, the illumination 1016 is directed to the one or more detectors 1020. For example, the illumination 1016 may be directed to one or more detectors 1020 via one or more of the set of optical elements 1010, the beam splitter 1008, and/or a set of optical elements 1018. It is noted herein that the set of optical elements 1010 and/or the set of optical elements 1018 may include any optical element known in the art suitable for focusing, suppressing, extracting, and/or directing the illumination 1016. In addition, it is noted herein the set of optical elements 1010, the beam splitter 1008, and the set of optical elements 1018 may be considered to be a set of collection optics for purposes of the present disclosure.

In one embodiment, the characterization tool 1000 includes the controller 1022. In another embodiment, the controller 1022 is operably coupled to one or more components of the characterization tool 1000. For example, the controller 1022 may be operably coupled to the illumination source 1002, the sample stage 1014, and/or the one or more detectors 1020. In this regard, the controller 1022 may direct any of the components of the characterization tool 1000 to carry out any one or more of the various functions described throughout the present disclosure.

In another embodiment, the controller 1022 includes one or more processors 1024 and memory 1026. In another embodiment, the memory 1026 stores a set of program instructions 1028. In another embodiment, the set of program instructions 1028 is configured to cause the one or more processors 1024 to carry out any of the one or more process steps described throughout the present disclosure (e.g., one or more steps of the method 100 and/or one or more steps of the method 900).

The controller 1022 may be configured to receive and/or acquire data or information from other systems or tools (e.g., one or more sets of information from the illumination source 1002, the sample stage 1014, and/or the one or more detectors 1020) of the characterization tool 1000 by a transmission medium that may include wireline and/or wireless portions. In addition, the controller 1022 may be configured to transmit data or information (e.g., the output of one or more procedures of the inventive concepts disclosed herein) to one or more systems or tools (e.g., one or more sets of information from the illumination source 1002, the sample stage 1014, and/or the one or more detectors 1020) of the characterization tool 1000 by a transmission medium that may include wireline and/or wireless portions. In this regard, the transmission medium may serve as a data link between the controller 1022 and the other subsystems of the characterization tool 1000. In addition, the controller 1022 may be configured to send data to external systems via a transmission medium (e.g., network connection).

The one or more processors 1024 may include any one or more processing elements known in the art. In this sense, the one or more processors 1024 may include any microprocessor device configured to execute algorithms and/or program instructions. For example, the one or more processors 1024 may consist of a desktop computer, mainframe computer system, workstation, image computer, parallel processor, handheld computer (e.g., tablet, smartphone, or phablet), or other computer system (e.g., networked computer). In general, the term "processor" may be broadly defined to encompass any device having one or more processing elements, which execute the set of program instructions 1028 from a non-transitory memory medium (e.g., the memory 1026). Moreover, different subsystems of the characterization tool 1000 (e.g., one or more sets of information from the illumination source 1002, the sample stage 1014, and/or the one or more detectors 1020) may include processor or logic elements suitable for carrying out at least a portion of the steps described throughout the present disclosure (e.g., one or more steps of the method 100 and/or one or more steps of the method 900). Therefore, the above description should not be interpreted as a limitation on the present disclosure but merely an illustration.

The memory 1026 may include any storage medium known in the art suitable for storing the set of program instructions 1028 executable by the associated one or more processors 1024. For example, the memory 1026 may include a non-transitory memory medium. For instance, the memory 1026 may include, but is not limited to, a read-only memory (ROM), a random access memory (RAM), a magnetic or optical memory device (e.g., disk), a magnetic tape, a solid state drive, and the like. The memory 1026 may be configured to provide display information to a display device of a user interface) In addition, the memory 1026 may be configured to store user input information from a user input device of the user interface. The memory 1026 may be housed in a common controller 1022 housing with the one or more processors 1024. The memory 1026 may, alternatively or in addition, be located remotely with respect to the spatial location of the processors 1024 and/or the controller 1022. For instance, the one or more processors 1024 and/or the controller 1022 may access a remote memory 1026 (e.g., server), accessible through a network (e.g., internet, intranet, and the like).

In one embodiment, the characterization tool 1000 includes a user interface. In another embodiment, the user interface is coupled to the controller 1022 (e.g., physically coupled, communicatively coupled, or both physically and communicatively coupled). In another embodiment, the user interface includes a display. In another embodiment, the user interface includes a user input device. In another embodiment, the display device is coupled to the user input device. For example, the display device may be coupled to the user input device by a transmission medium that may include wireline and/or wireless portions.

The display device may include any display device known in the art. For example, the display device may include, but is not limited to, a liquid crystal display (LCD). By way of another example, the display device may include, but is not limited to, an organic light-emitting diode (OLED) based display. By way of another example, the display device may include, but is not limited to a CRT display. Those skilled in the art should recognize that a variety of display devices may be suitable for implementation in the present invention and the particular choice of display device may depend on a variety of factors, including, but not limited to, form factor, cost, and the like. In a general sense, any display device capable of integration with a user input device (e.g., touchscreen, bezel mounted interface, keyboard, mouse, trackpad, and the like) is suitable for implementation in the present invention.

The user input device may include any user input device known in the art. For example, the user input device may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the user input device may include, but is not limited to, a bezel mounted interface.

Figure 11:
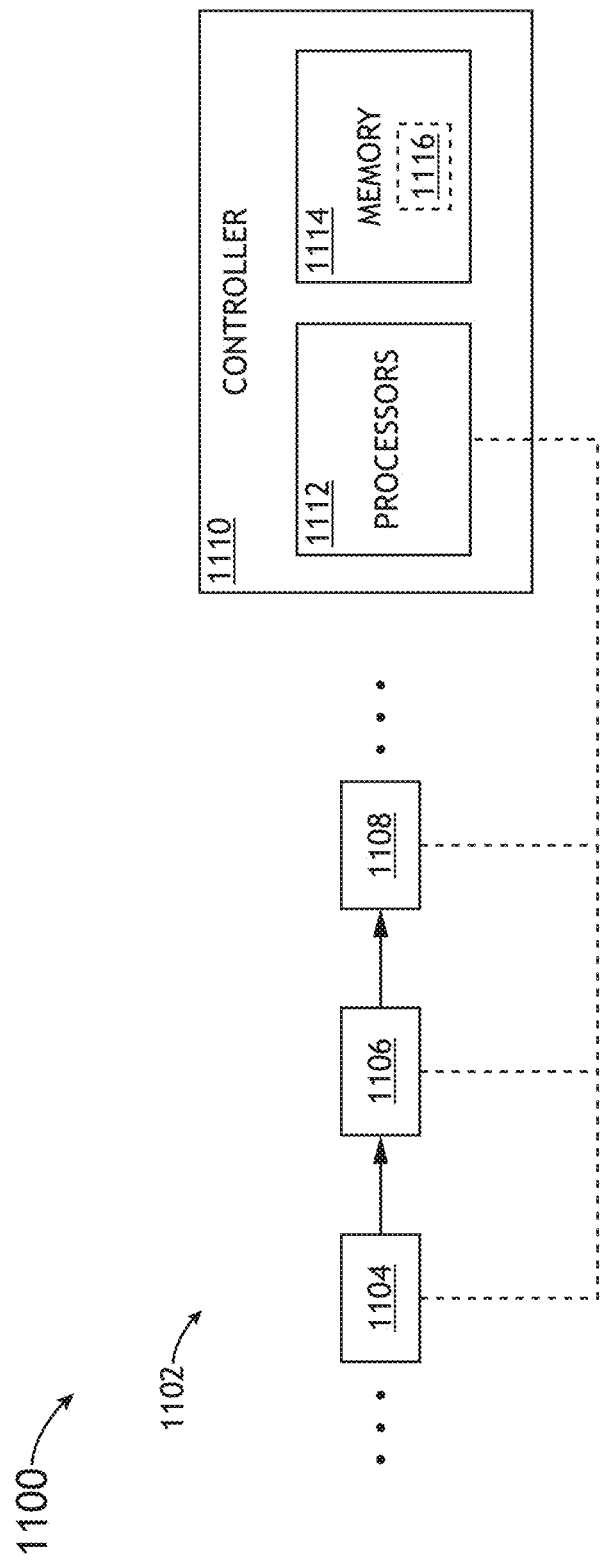
FIG. 11 illustrate a system for aligning semiconductor device reference images and test images, in accordance with one or more embodiments of the present disclosure.

FIG. 11 illustrates a system 1100 capable of performing one or more steps of the method 100 and/or one or more steps of the method 900, in accordance with one or more embodiments of the present disclosure.

In one embodiment, the system 1100 includes a tool cluster 1102. In another embodiment, the tool cluster 1102 includes one or more fabrication process tools 1104. In another embodiment, the tool cluster 1102 includes one or more characterization tools 1106. In another embodiment, the tool cluster 1102 includes one or more fabrication process tools 1108.

The tool cluster 1102 may include any fabrication process tools 1104, 1108 known in the art. For example, the fabrication process tools 1104, 1108 may include, but are not limited to, a deposition process tool (e.g., a film deposition (e.g., chemical vapor deposition (CVD)) tool), a lithography process tool, a chemical-mechanical polishing (CMP) process tool, an etching process tool, and/or an ion implantation process tool.

The tool cluster 1102 may include any characterization tool 1106 known in the art. For example, the tool cluster 1102 may include, but is not limited to, a characterization tool (e.g., characterization tool 1000). By way of another example, the characterization tool 1106 may include, but is not limited to, an interferometer tool. For instance, characterization tool 1106 may include, but is not limited to, a dual wavelength dual interferometer (e.g., a dual wavelength dual Fizeau interferometer (DWDFI)). In addition, the characterization tool 1106 may be adapted to perform patterned wafer geometry (PWG) measurements on the sample 1012, whereby the dynamic range of the sample slope (e.g., wafer slope) measured by the characterization tool 1106 is extended by stitching measurement results of different regions of the sample 1012 together. By way of another example, the characterization tool 1106 may include, but is not limited to, an electron beam inspection tool or review tool (e.g., an SEM review tool).

It is noted herein the tool cluster 1102 is not limited to including only the fabrication process tool 1104, the characterization tool 1106, and the fabrication process tool 1108 as illustrated in FIG. 11. For example, the tool cluster 1102 may include one or more fabrication process tools and/or one or more characterization tools prior to the fabrication process tool 1104 in the tool cluster 1102. By way of another example, the tool cluster 1102 may include one or more fabrication process tools and/or one or more characterization tools following the fabrication process tool 1108 in the tool cluster 1102. By way of another example, the tool cluster 1102 may include one or more fabrication process tools and/or one or more characterization tools in line between the fabrication process tool 1104 and the characterization tool 1106. By way of another example, the tool cluster 1102 may include one or more fabrication process tools and/or one or more characterization tools in line between the characterization tool 1106 and the fabrication process tool 1108. By way of another example, the tool cluster 1102 may not include the fabrication process tool 1104, the characterization tool 1106, and/or the fabrication process tool 1108. Therefore, the above description should not be interpreted as a limitation on the scope of the present disclosure but merely an illustration.

In another embodiment, the system 1100 includes a controller 1110 communicatively coupled to the one or more fabrication process tools 1104, the one or more characterization tools 1106, and/or the one or more fabrication process tools 1108. In another embodiment, the controller 1110 includes one or more processors 1112 and memory 1114. In another embodiment, the memory 1114 stores a set of program instructions 1116. In another embodiment, the set of program instructions 1116 are configured to cause the one or more processors 1112 to carry out any of the one or more process steps described throughout the present disclosure (e.g., one or more steps of the method 100 and/or one or more steps of the method 900).

In another embodiment, a user interface is communicatively coupled to the controller 1110. In another embodiment, the user interface includes a display. In another embodiment, the user interface includes a user input device.

It is noted herein that the embodiments directed to the controller 1022, the one or more processors 1024, the memory 1026, the program instructions 1028, and/or the user interface communicatively coupled to the controller 1022 may be directed to the controller 1110, the one or more processors 1112, the memory 1114, the program instructions 1116, and/or the user interface communicatively coupled to the controller 1110. Therefore, the above description should not be interpreted as a limitation on the present disclosure but merely an illustration.

In addition, it is noted herein that, where the characterization tool 1106 is the characterization tool 1000, the controller 1022 and the controller 1110 may be separate components or a single component of the system 1100. Therefore, the above description should not be interpreted as a limitation on the present disclosure but merely an illustration.

Advantages of the present disclosure are directed to a system and method for aligning semiconductor device reference images and test images via a coarse alignment step and a fine alignment step. Advantages of the present disclosure are also directed to a system and method for measuring offsets of runtime alignment (RTA) blocks from selected optical scan and wafer arrangements (e.g., same optical scan, different optical scans, optical scan/design data, same die row, different die rows, same wafer, different wafers or the like). Advantages of the present disclosure are also directed to a system and method for measuring individual offset using alignment targets. Advantages of the present disclosure are also directed to a system and method for correcting individual alignment errors using individual offset measurements on an entire swath from multiple sensor swaths. Advantages of the present disclosure are also directed to a system and method for correcting for optical distortion between reference images and test images. Advantages of the present disclosure are also directed to a system and method for adjusting semiconductor devices based on generated correctables, the correctables generated based on determined defects in the aligned reference images and test images.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although particular embodiments of this invention have been illustrated, it is apparent that various modifications and embodiments of the invention may be made by those skilled in the art without departing from the scope and spirit of the foregoing disclosure. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

What is claimed:

1. A system, comprising: a controller, wherein the controller includes one or more processors configured to receive one or more images from a characterization tool, wherein the controller includes memory configured to store a set of program instructions, wherein the one or more processors are configured to execute the set of program instructions, wherein the set of program instructions are configured to cause the one or more processors to: receive a plurality of reference images from a sensor swath of a wafer, wherein the sensor swath is obtained from a single scan of the wafer; receive a plurality of test images from the sensor swath of the wafer; align the plurality of reference images and the plurality of test images via a coarse alignment process; and align the plurality of reference images and the plurality of test images via a fine alignment process by removing one or more incorrect individual offsets from a plurality of individual offsets after alignment via the coarse alignment process, wherein the fine alignment process comprises measuring individual offsets and correcting individual offset data between at least one of the plurality of reference images and the plurality of test images.

2. The system in claim 1, wherein the plurality of reference images are received from the characterization tool, wherein the plurality of test images are received from the characterization tool, wherein the characterization tool is configured to acquire the plurality of reference images and the plurality of test images from a same scan of the wafer.

3. The system in claim 2, wherein the plurality of reference images include a golden reference generated from a die row of the wafer, wherein the plurality of test images are generated from another die row of the wafer.

4. The system in claim 1, wherein the plurality of reference images are received from the characterization tool, wherein the plurality of test images are received from the characterization tool, wherein the characterization tool is configured to acquire the plurality of reference images and the plurality of test images from different scans of the wafer.

5. The system in claim 4, wherein the plurality of reference images include a golden reference generated from a first scan of the wafer, wherein the plurality of test images are generated from a second scan of the wafer.

6. The system in claim 1, wherein the plurality of reference images are received from the characterization tool, wherein the plurality of test images are received from the characterization tool, wherein the characterization tool is configured to acquire the plurality of reference images from a scan of a first wafer, wherein the characterization tool is configured to acquire the plurality of test images from a scan of a second wafer.

7. The system in claim 1, wherein the plurality of reference images are generated from design data, wherein the plurality of test images are received from the characterization tool.

8. The system in claim 1, wherein the set of program instructions are further configured to cause the one or more processors to:
align the plurality of reference images and the plurality of test images via a fine alignment process by measuring the plurality of individual offsets between the plurality of reference images and the plurality of test images.

9. The system in claim 8, wherein the set of program instructions are further configured to cause the one or more processors to:
align the plurality of reference images and the plurality of test images via a fine alignment process by adjusting the measured plurality of individual offsets to correct distortion.

10. The system in claim 9, wherein the set of program instructions are further configured to cause the one or more processors to:
align the plurality of reference images and the plurality of test images via a fine alignment process by filling in one or more individual offsets missing from the plurality of individual offsets.

11. The system in claim 10, wherein the set of program instructions are further configured to cause the one or more processors to:
align the plurality of reference images and the plurality of test images via a fine alignment process by adjusting the measured individual offsets to include the corrected distortion.

12. The system in claim 8, wherein the set of program instructions are further configured to cause the one or more processors to:
align the plurality of reference images and the plurality of test images via a fine alignment process by measuring alignment offset based on one or more alignment targets.

13. The system in claim 8, wherein the set of program instructions are further configured to cause the one or more processors to:
align the plurality of reference images and the plurality of test images via a fine alignment process by using individual measured offsets from the sensor swath.

14. The system in claim 1, wherein the set of program instructions are further configured to cause the one or more processors to:
detect one or more defects on the wafer based on the aligned plurality of reference images and plurality of test images.

15. The system in claim 14, wherein the set of program instructions are further configured to cause the one or more processors to:
generate one or more correctables based on the one or more detected defects.

16. The system in claim 15, wherein the set of program instructions are further configured to cause the one or more processors to:
provide the one or more correctables to one or more tools in a semiconductor tool cluster to adjust the one or more detected defects.

17. The system in claim 16, wherein the one or more correctables are provided to the one or more tools in the semiconductor tool cluster via a feed forward loop.

18. The system in claim 16, wherein the one or more correctables are provided to the one or more tools in the semiconductor tool cluster via a feedback loop.

19. The system in claim 1, wherein the characterization tool comprises an inspection tool.

20. The system in claim 1, wherein the characterization tool comprises a review tool.

21. The system in claim 1, wherein the characterization tool comprises:
an illumination source configured to generate a first beam of illumination;
a set of focusing optics configured to direct the first beam of illumination onto a surface of the wafer;

at least one detector configured to detect a second beam of illumination reflected or scattered from the surface of the wafer in response to at least a portion of the first beam of illumination;
a set of collection optics configured to direct the second beam of illumination reflected or scattered from the surface of the wafer to the at least one detector; and
a stage for securing the wafer.

22. The system in claim 21, wherein the at least one detector of the characterization tool images the one or more detected defects on the surface of the wafer.

23. The system in claim 16, wherein the one or more tools of the semiconductor tool cluster comprise:
at least one of one or more semiconductor fabrication process tools or one or more characterization tools.

24. A system, comprising: a characterization tool configured to acquire a plurality of test images of a wafer; and a controller, wherein the controller includes one or more processors configured to receive one or more images from the characterization tool, wherein the controller includes memory configured to store a set of program instructions, wherein the one or more processors are configured to execute the set of program instructions, wherein the set of program instructions are configured to cause the one or more processors to: receive a plurality of reference images from a sensor swath of the wafer, wherein the sensor swath is obtained from a single scan of the wafer; receive a plurality of test images from the sensor swath; align the plurality of reference images and the plurality of test images via a coarse alignment process; and align the plurality of reference images and the plurality of test images via a fine alignment process by removing one or more incorrect individual offsets from a plurality of individual offsets after alignment via the coarse alignment process, wherein the fine alignment process comprises measuring individual offsets and correcting individual offset data between at least one of the plurality of reference images and the plurality of test images.

25. The system in claim 24, wherein the characterization tool is further configured to acquire the plurality of reference images of the wafer.

26. The system in claim 25, wherein the characterization tool is further configured to acquire the plurality of reference images and the plurality of test images from a same scan of the wafer.

27. The system in claim 26, wherein the plurality of reference images include a golden reference generated from a die row of the wafer, wherein the plurality of test images are generated from another die row of the wafer.

28. The system in claim 25, wherein the characterization tool is further configured to acquire the plurality of reference images and the plurality of test images from different scans of the wafer.

29. The system in claim 28, wherein the plurality of reference images include a golden reference generated from a first scan of the wafer, wherein the plurality of test images are generated from a second scan of the wafer.

30. The system in claim 24, wherein the plurality of reference images are received from the characterization tool, wherein the plurality of test images are received from the characterization tool, wherein the characterization tool is configured to acquire the plurality of reference images from a scan of a first wafer, wherein the characterization tool is configured to acquire the plurality of test images from a scan of a second wafer.

31. The system in claim 24, wherein the plurality of reference images are generated from design data.

32. A method, comprising: receiving a plurality of reference images from a sensor swath of a wafer, wherein the sensor swath is obtained from a single scan of the wafer; receiving a plurality of test images from the sensor swath of the wafer; aligning the plurality of reference images and the plurality of test images via a coarse alignment process; and aligning the plurality of reference images and the plurality of test images via a fine alignment process by removing one or more incorrect individual offsets from a plurality of individual offsets after alignment via the coarse alignment process, wherein the fine alignment process comprises measuring individual offsets and correcting individual offset data between at least one of the plurality of reference images and the plurality of test images.

33. The method in claim 32, wherein the plurality of reference images are received from a characterization tool, wherein the plurality of test images are received from the characterization tool, wherein the characterization tool is configured to acquire the plurality of reference images and the plurality of test images from a same scan of the wafer.

34. The method in claim 33, wherein the plurality of reference images include a golden reference generated from a die row of the wafer, wherein the plurality of test images are generated from another die row of the wafer.

35. The method in claim 32, wherein the plurality of reference images are received from a characterization tool, wherein the plurality of test images are received from the characterization tool, wherein the characterization tool is configured to acquire the plurality of reference images and the plurality of test images from different scans of the wafer.

36. The method in claim 35, wherein the plurality of reference images include a golden reference generated from a first scan of the wafer, wherein the plurality of test images are generated from a second scan of the wafer.

37. The method in claim 32, wherein the plurality of reference images are received from a characterization tool, wherein the plurality of test images are received from the characterization tool, wherein the characterization tool is configured to acquire the plurality of reference images from a scan of a first wafer, wherein the characterization tool is configured to acquire the plurality of test images from a scan of a second wafer.

38. The method in claim 32, wherein the plurality of reference images are generated from design data, wherein the plurality of test images are received from a characterization tool.

39. The method in claim 32, wherein the aligning the plurality of reference images and the plurality of test images via the fine alignment process further comprises:
measuring the plurality of individual offsets between the plurality of reference images and the plurality of test images.

40. The method in claim 39, wherein the aligning the plurality of reference images and the plurality of test images via the fine alignment process further comprises:
adjusting the measured plurality of individual offsets to correct distortion.

41. The method in claim 10, wherein the aligning the plurality of reference images and the plurality of test images via the fine alignment process further comprises:
filling in one or more individual offsets missing from the plurality of individual offsets.

42. The method in claim 41, wherein the aligning the plurality of reference images and the plurality of test images via the fine alignment process further comprises:
adjusting the measured individual offsets to include the corrected distortion.

43. The method in claim 39, wherein a set of program instructions are configured to cause one or more processors to:
  align the plurality of reference images and the plurality of test images via a fine alignment process by measuring alignment offset based on one or more alignment targets.

44. The method in claim 39, wherein a set of program instructions are configured to cause one or more processors to:
  align the plurality of reference images and the plurality of test images via a fine alignment process by using individual measured offsets from the sensor swath.

45. The method in claim 32, further comprising:
  detecting one or more defects on the wafer based on the aligned plurality of reference images and plurality of test images.

46. The method in claim 45, further comprising:
  generating one or more correctables in response to the one or more detected defects.

47. The method in claim 46, further comprising:
  providing the one or more correctables to one or more tools in a semiconductor tool cluster to adjust the one or more detected defects.

48. The method in claim 47, wherein the one or more correctables are provided to the one or more tools in the semiconductor tool cluster via a feed forward loop.

49. The method in claim 47, wherein the one or more correctables are provided to the one or more tools in the semiconductor tool cluster via a feedback loop.

* * * * *